(12) United States Patent
Unagami et al.

(10) Patent No.: US 12,301,654 B2
(45) Date of Patent: May 13, 2025

(54) CONTROL METHOD, MOBILE NODE, AND RECORDING MEDIUM

(71) Applicant: Panasonic Intellectual Property Corporation of America, Torrance, CA (US)

(72) Inventors: Yuji Unagami, Osaka (JP); Tetsuji Fuchikami, Osaka (JP); Yuuki Hirose, Osaka (JP); Ayaka Mitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 383 days.

(21) Appl. No.: 17/986,230

(22) Filed: Nov. 14, 2022

(65) Prior Publication Data

US 2023/0073703 A1 Mar. 9, 2023

Related U.S. Application Data

(63) Continuation of application No. PCT/JP2021/019386, filed on May 21, 2021.
(Continued)

(51) Int. Cl.
*H04L 67/1042* (2022.01)
*H04L 67/1095* (2022.01)
(Continued)

(52) U.S. Cl.
CPC ...... *H04L 67/1042* (2013.01); *H04L 67/1095* (2013.01); *H04W 40/246* (2013.01);
(Continued)

(58) Field of Classification Search
CPC ........... H04L 67/1042; H04L 67/1095; H04W 40/246; H04W 40/248
(Continued)

(56) References Cited

U.S. PATENT DOCUMENTS

| | | |
|---|---|---|
| 2005/0220101 A1 | 10/2005 | Westhoff et al. |
| 2009/0129316 A1 | 5/2009 | Ramanathan et al. |

(Continued)

FOREIGN PATENT DOCUMENTS

| | | |
|---|---|---|
| JP | 2005-295538 | 10/2005 |
| JP | 2006-254420 | 9/2006 |

OTHER PUBLICATIONS

Extended European Search Report issued Nov. 15, 2023 in corresponding European Patent Application No. 21812152.3.
(Continued)

*Primary Examiner* — Ted M Wang
(74) *Attorney, Agent, or Firm* — Wenderoth, Lind & Ponack, L.L.P.

(57) ABSTRACT

A control method to be performed by a first mobile node disconnected from a mobile line among a plurality of mobile nodes each being connectable to the mobile line includes: transmitting and receiving a mobile line connection status to and from each of one or more second mobile nodes via near-field wireless communication; building a MANET with the one or more second mobile nodes based on a first mobile line connection status of the first mobile node and a second mobile line connection status of each of the one or more second mobile nodes; generating, after the building of the MANET, first transaction data including at least first MANET routing information that indicates the MANET connection status of the first mobile node; and recording a block including the first transaction data into a first distributed ledger that is used for a blockchain in the MANET.

11 Claims, 11 Drawing Sheets

Related U.S. Application Data

(60) Provisional application No. 63/031,214, filed on May 28, 2020.

(51) Int. Cl.
 *H04W 40/24* (2009.01)
 *H04W 4/80* (2018.01)
 *H04W 84/18* (2009.01)

(52) U.S. Cl.
 CPC ............ *H04W 40/248* (2013.01); *H04W 4/80* (2018.02); *H04W 84/18* (2013.01)

(58) Field of Classification Search
 USPC .......................................... 455/414
 See application file for complete search history.

(56) References Cited

U.S. PATENT DOCUMENTS

2009/0239467 A1\* 9/2009 Gulin .................... H04W 76/14
 455/41.2
2017/0180033 A1\* 6/2017 Tobin ................. H04B 7/15507

OTHER PUBLICATIONS

Maqsood Ahamed Abdul Careem et al., "Reputation Based Routing in MANET using Blockchain", 2020 12th International Conference on Communication Systems & Networks (COMSNETS), IEEE, Jan. 2020, pp. 1-6.

International Search Report (ISR) issued on Jul. 20, 2021 in International (PCT) Application No. PCT/JP2021/019386.

Irfan Ahmad Rasooly, et al., "Performance Analysis of Manet Routing Protocols", International Journal of Engineering Applied Sciences and Technology, 2019, vol. 4, Issue 8, ISSN No. 2455-2143, pp. 356-361.

"Knowledge base", The Institute of Electronics, Information and Communication Engineers, Group 4 (Mobile, Wireless)—vol. 5 (Mobile IP, Ad hoc network), Chapter 2, Ad hoc network, 2010, with its English partial translation.

"Development of disaster evacuation guidance system using MANET", KAKEN, Research Project, Project/Area Number No. 17K01342, Principal Investigator: Matsuzawa Tomofumi, (Internet: https://kaken.nii.ac.jp/ja/grant/KAKENHI-PROJECT-17K01342/), Apr. 28, 2017, with its English partial translation.

\* cited by examiner

| Reference point mobile node | Neighbor mobile node |
|---|---|
| 100a | 100b, 100c |
| 100b | 100a, 100c, 100f, 200a |
| 100d | 100c |
| 100e | 100c |
| 100f | 100b, 100g |
| 100g | 100f |

| Destination mode | Next hop-hop node |
|---|---|
| 100a | 100a |
| 100b | 100b |
| 100d | 100d |
| 100e | 100e |
| 100f | 100b |
| 100g | 100b |

| Destination | 100a | 100b | 100c | 100d | 100e | 100f | 100g | Ratio (%) |
|---|---|---|---|---|---|---|---|---|
| 100a | - | 100b | 100c | 100c | 100c | 100b | 100b | 4.76 |
| 100b | 100a | - | 100c | 100c | 100c | 100f | 100f | 26.2 |
| 100c | 100a | 100b | - | 100d | 100e | 100b | 100b | 42.9 |
| 100d | 100c | 100c | 100c | - | 100c | 100c | 100c | 2.38 |
| 100e | 100c | 100c | 100c | 100c | - | 100c | 100c | 2.38 |
| 100f | 100b | 100b | 100b | 100b | 100b | - | 100g | 19.0 |
| 100g | 100f | 100f | 100f | 100f | 100f | 100f | - | 2.38 |

CONTROL METHOD, MOBILE NODE, AND RECORDING MEDIUM

CROSS REFERENCE TO RELATED APPLICATIONS

This is a continuation application of PCT International Application No. PCT/JP2021/019386 filed on May 21, 2021, designating the United States of America, which is based on and claims priority of U.S. Provisional Patent Application No. 63/031,214 filed on May 28, 2020. The entire disclosures of the above-identified applications, including the specifications, drawings and claims are incorporated herein by reference in their entirety.

FIELD

The present disclosure relates to control methods, mobile nodes, and recording media, and particularly relates to a control method, a mobile node, and a recording medium in each of which blockchain technology is used.

BACKGROUND

A network that connects devices such as mobile terminals to each other via wireless communication and serially connects direction communication between the devices is known as a mobile ad hoc network (MANET). In other words, the MANET is a network made up of a collection of mobile nodes including communication functions, such as mobile terminals, and mutual communication is achieved by the mobile nodes only. The MANET is used in applications where a provisional network is built when cellular networks provided as backbone networks are disrupted in times of disaster, for example. Note that the cellular network is a network where, in an area divided into subareas each having a fixed size, a base station is provided at the center of each of the subareas and mobile terminals within a predetermined range from the base station communicate with the base station. The cellular network will be hereinafter referred to as a mobile network.

The mobile nodes are capable of geographically moving by users; using near-field communication, the mobile nodes constitute the MANET. Therefore, the network topology of the MANET may be frequently changed. This means that there is instability in the MANET.

Regarding this matter, there is a proposed technique that can maintain the MANET (for example, refer to Patent Literature (PTL) 1).

PTL 1 describes maintaining the MANET by performing billing and rewarding processes, etc., that correspond to the roles of mobile nodes or routing protocols optimized for wireless multi-hop networks.

CITATION LIST

Patent Literature

PTL 1: Japanese Unexamined Patent Application Publication No. 2006-254420

Non Patent Literature

NPL 1: "PERFORMANCE ANALYSIS OF MANET ROUTING PROTOCOLS" International Journal of Engineering Applied Sciences and Technology, 2019 Vol. 4, Issue 8, ISSN No. 2455-2143, Pages 356-361

SUMMARY

Technical Problem

However, there is no scheme that when the mobile network fails in a part of the area thereof, urge the mobile nodes to geographically move and build a temporary MANET in that part of the area.

The present disclosure is conceived in view of the above-described circumstances and has an object to provide a control method, etc., that can urge that a temporary MANET be built.

Solution to Problem

In order to achieve the aforementioned object, a control method according to the present disclosure is a control method to be performed by a first mobile node in a system including a plurality of mobile nodes each including a first distributed ledger and a second distributed ledger and being connectable to a mobile line, the first mobile node being included in the plurality of mobile nodes and disconnected from the mobile line, the control method including: transmitting and receiving a mobile line connection status to and from each of one or more second mobile nodes via near-field wireless communication, the mobile line connection status being information indicating whether the mobile line is connected, the one or more second mobile nodes being one or more mobile nodes other than the first mobile node among the plurality of mobile nodes; building a mobile ad hoc network (MANET) with the one or more second mobile nodes based on a first mobile line connection status of the first mobile node and a second mobile line connection status of each of the one or more second mobile nodes; generating first transaction data after the building of the MANET, the first transaction data including at least first MANET routing information indicating a MANET connection status of the first mobile node as MANET routing information to be used to indicate a position and a role of each of the first mobile node and the one or more second mobile nodes in a network topology of the MANET; and recording a block including the first transaction data into the first distributed ledger that is used for a blockchain in the MANET.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

According to the present disclosure, it is possible to urge that a temporary MANET be built.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
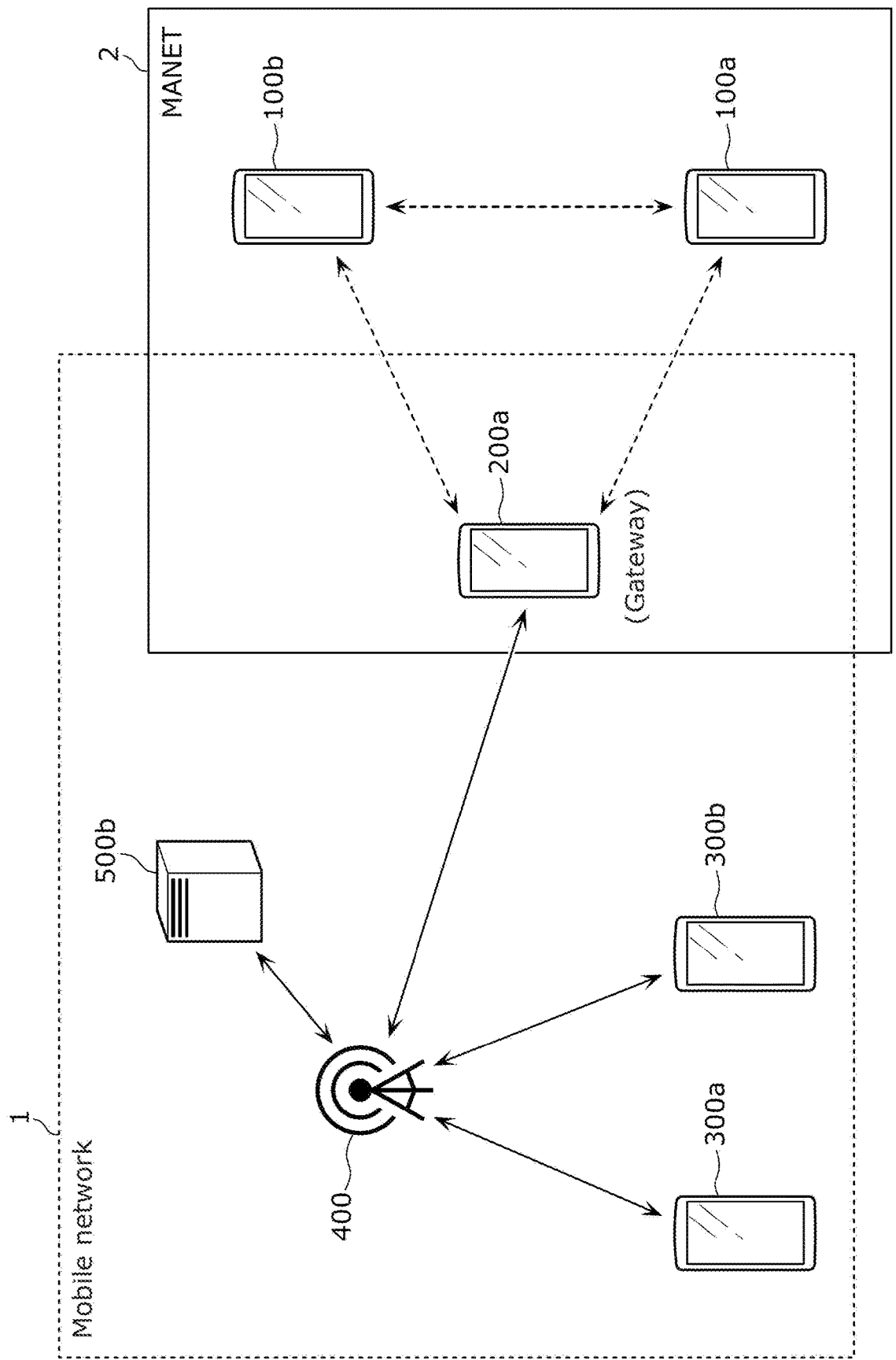
FIG. 1 is a diagram illustrating one example of a configuration including a mobile network and a MANET according to an exemplary embodiment.

A control method according to one aspect of the present disclosure is a control method to be performed by a first mobile node in a system including a plurality of mobile nodes each including a first distributed ledger and a second distributed ledger and being connectable to a mobile line, the first mobile node being included in the plurality of mobile nodes and disconnected from the mobile line, the control method including: transmitting and receiving a mobile line connection status to and from each of one or more second mobile nodes via near-field wireless communication, the mobile line connection status being information indicating whether the mobile line is connected, the one or more second mobile nodes being one or more mobile nodes other than the first mobile node among the plurality of mobile nodes; building a mobile ad hoc network (MANET) with the one or more second mobile nodes based on a first mobile line connection status of the first mobile node and a second mobile line connection status of each of the one or more second mobile nodes; generating first transaction data after the building of the MANET, the first transaction data including at least first MANET routing information indicating a MANET connection status of the first mobile node as MANET routing information to be used to indicate a position and a role of each of the first mobile node and the one or more second mobile nodes in a network topology of the MANET; and recording a block including the first transaction data into the first distributed ledger that is used for a blockchain in the MANET.

With this, it is possible to urge that a temporary MANET be built.

More specifically, even when there is no connection to a mobile network, by recording the MANET routing information into the first distributed ledger that is extremely difficult to tamper with, the degrees of contribution to the network topology at the time of building the MANET can be recorded in a tamper-proof format. Thus, users of the mobile nodes can expect to, for example, receive incentives corresponding to the degrees of contribution recorded in the first distributed ledger, meaning that it is possible to urge the mobile nodes to geographically move and build a MANET.

Furthermore, in the recording of the block into the first distributed ledger, the block that includes the first transaction data and one or more second transaction data may be recorded into the first distributed ledger, each of the one or more second transaction data including second MANET routing information indicating a MANET connection status of one of the one or more second mobile nodes that has been obtained from the second mobile node.

With this, the MANET routing information of a mobile node other than the first mobile node contributed at the time of building the MANET can also be recorded into the first distributed ledger.

Furthermore, the control method may further include: generating third transaction data when the first mobile node is connected to the mobile line in a state where the one or more second mobile nodes are disconnected from the mobile line, the third transaction data including at least the first MANET routing information recorded in the first distributed ledger; and recording a block including the third transaction data into the second distributed ledger that is used for a blockchain in the mobile line.

With this, after the MANET is built, when the first mobile node is successfully connected to the mobile network, the MANET routing information recorded in the first distributed ledger can be recorded into the second distributed ledger formed in an overlay network for the mobile network. Therefore, users of the mobile nodes can expect to, for example, receive incentives corresponding to the degrees of contribution recorded in the first distributed ledger, meaning that it is possible to urge the mobile nodes to further make graphical movement and connect to the mobile network. Thus, it is possible to urge that a provisional network be built when cellular networks provided as backbone networks are disrupted in times of disaster, for example.

Furthermore, the control method may further include: generating third transaction data when one second mobile node included in the one or more second mobile nodes is connected to the mobile line in a state where the one or more second mobile nodes are disconnected from the mobile line, the third transaction data including at least second MANET routing information indicating a MANET connection status of the one second mobile node that has been recorded in the first distributed ledger for the one second mobile node as the MANET routing information; and recording a block including the third transaction data into the second distributed ledger that is used for a blockchain in the mobile line.

Furthermore, the control method may further include: providing an incentive to each of the first mobile node and the one or more second mobile nodes according to a degree of contribution to building the MANET after the recording of the third transaction data into the second distributed ledger, the degree of contribution being calculated based on the first MANET routing information.

Thus, incentives corresponding to the degrees of contribution recorded in the first distributed ledger can be provided to mobile nodes that have contributed at the time of building a MANET, meaning that it is possible to urge the mobile nodes to geographically move and build a MANET.

Furthermore, the first MANET routing information may include an identifier indicating each of the one or more second mobile nodes that performs the near-field wireless communication with the first mobile node in the MANET, and in the providing of the incentive, an incentive proportional to a total number of identifiers included in the first MANET routing information may be provided to the first mobile node.

Furthermore, the first MANET routing information may include distance information regarding a distance between the first mobile node and each of the one or more second mobile nodes, and a greater incentive may be provided to a second mobile node among the one or more second mobile nodes that is located at a greater distance from the first mobile node.

Furthermore, the first MANET routing information may include information regarding radio field strength of the near-field wireless communication performed between the first mobile node and each of the one or more second mobile nodes, and a greater incentive may be provided to a second mobile node among the one or more second mobile nodes that performs the near-field wireless communication at lower radio field strength with the first mobile node.

Furthermore, in the recording of the block including the first transaction data into the first distributed ledger, the block may be recorded into the first distributed ledger through execution of a consensus algorithm.

A mobile node according to one aspect of the present disclosure is one mobile node in a system including a plurality of mobile nodes each including a first distributed ledger and a second distributed ledger and being connectable to a mobile line, the one mobile node being included in the plurality of mobile nodes and disconnected from the mobile line, the one mobile node including: a connection status transmitter/receiver that transmits and receives a mobile line connection status to and from each of one or more mobile nodes via near-field wireless communication, the mobile line connection status being information indicating whether the mobile line is connected, the one or more mobile nodes being other than the one mobile node among the plurality of mobile nodes; a communicator that builds a MANET with the one or more mobile nodes based on a first mobile line connection status of the one mobile node and a second mobile line connection status of each of the one or more mobile nodes; a transaction data generator that generates first transaction data after the MANET is built, the first transaction data including at least first MANET routing information indicating a MANET connection status of the one mobile node as MANET routing information to be used to indicate a position and a role of each of the one mobile node and the one or more mobile nodes in a network topology of the MANET; and a MANET ledger unit that records a block including the first transaction data into the first distributed ledger that is used for a blockchain in the MANET.

Hereinafter, an exemplary embodiment will be described with reference to the drawings. Note that each exemplary embodiment described below shows one specific preferred example of the present disclosure. This means that the numerical values, shapes, materials, structural elements, the arrangement and connection of the structural elements, steps, the processing order of the steps, etc., shown in the following exemplary embodiment are mere examples, and are not intended to limit the present disclosure. The present disclosure is defined based on the recitations of the Claims. Therefore, among the structural elements in the following exemplary embodiment, structural elements not recited in any one of the independent claims which indicate the broadest concepts of the present disclosure are not necessarily required to achieve the object of the present disclosure, but are described as structural elements of a more preferred exemplary embodiment.

Embodiment

[1. System Configuration]

In a system according to the present disclosure, when mobile nodes including a distributed ledger for mobile networks and a distributed ledger for MANETs build a MANET, MANET routing information of the mobile nodes is recorded into the distributed ledger for MANETs. Subsequently, the degrees of contribution to the network topology at the time of building the MANET is recorded in a tamper-proof format; thus, users of the mobile nodes can expect to, for example, receive incentives corresponding to the degrees of contribution recorded in the distributed ledger. In this manner, with the system according to the present disclosure, it is possible to urge the mobile nodes to geographically move and build a MANET.

Hereinafter, the system configuration, etc., according to an exemplary embodiment will be described with reference to the drawings

[1.1 Network Configuration]

FIG. 1 is a diagram illustrating one example of a configuration including mobile network 1 and MANET 2 according to an exemplary embodiment.

Mobile network 1, which is a cellular network provided by a mobile line service provider such as a network vendor, includes mobile nodes 200a, 300a, 300b, at least one base station 400, and servicer node 500b. Mobile network 1 may also be referred to as mobile lines. The present exemplary embodiment assumes that a part of the area covered by mobile network 1 (that is referred to as an area of outage) is disconnected or down. The example illustrated in FIG. 1 indicates that mobile network 1 does not form a network with mobile node 100a and mobile node 100b which are located in the area of outage.

MANET 2 is a network that connects mobile node 100a, mobile node 100b, and mobile node 200a to each other via near-field wireless communication and serially connects direct communication between the mobile nodes. In the example illustrated in FIG. 1, MANET 2 includes: mobile node 100a and mobile node 100b which are located in the area of outage of mobile network 1; and mobile node 200a which is connected to mobile network 1 as well after MANET 2 is built.

Each of mobile nodes 100a, 100b, 200a, 300a, 300b is a device capable of moving such as a mobile terminal capable of building a MANET using near-field wireless communication. Each of mobile nodes 100a, 100b, 200a, 300a, 300b includes a first distributed ledger for blockchains in MANET 2 and a second distributed ledger for blockchains in mobile network 1 and can be connected to mobile network 1. This means that each of mobile nodes 100a, 100b, 200a, 300a, 300b functions as a blockchain. Note that communication performed by connecting to mobile lines (mobile network 1)

via base station 400 will be hereinafter referred to as mobile network communication. Furthermore, the present exemplary embodiment assumes that all mobile nodes 100a, 100b, 200a, 300a, 300b have the same functions and configurations.

In the example illustrated in FIG. 1, as described above, mobile nodes 100a, 100b, 200a among mobile nodes 100a, 100b, 200a, 300a, 300b build a MANET and perform communication (referred to as MANET communication). Mobile nodes 200a, 300a, 300b perform mobile network communication. By performing the mobile network communication, mobile nodes 200a, 300a, 300b can be connected to backbone networks such as the Internet. Furthermore, mobile node 200a illustrated in FIG. 1 plays the role of a gateway that relays packets between a stand-alone MANET including mobile nodes 100a, 100b and mobile network 1.

Here, the stand-alone MANET means a form in which the MANET exists independently. Specifically, the form of the MANET at the time when all the mobile nodes included in the MANET perform only the MANET communication is referred to as the stand-alone MANET. In contrast, a connecting MANET means a form in which at least one of the mobile nodes included in the MANET is connected to the Internet or the like via mobile network 1. Specifically, the form of the MANET at the time when among the mobile nodes included in the MANET, at least one mobile node performs the mobile network communication as well and another mobile node performs the MANET communication only is referred to as the connecting MANET.

Servicer node 500b is connected to a mobile line owned by a mobile line service provider, which is a servicer, and forms mobile network 1. Furthermore, servicer node 500b functions as a blockchain as well. More specifically, servicer node 500b includes, in addition to a communication function for connection to the mobile line, the second distributed ledger for blockchains in mobile network 1, and can deploy a smart contract to be described later to the blockchain in mobile network 1.

Thus, the system according to the present disclosure includes: mobile nodes 100a, 100b, 200a, 300a, 300b capable of the MANET communication using near-field wireless communication; at least one base station 400; and servicer node 500b.

[1.2 Blockchain Network Configuration]

Figure 2:
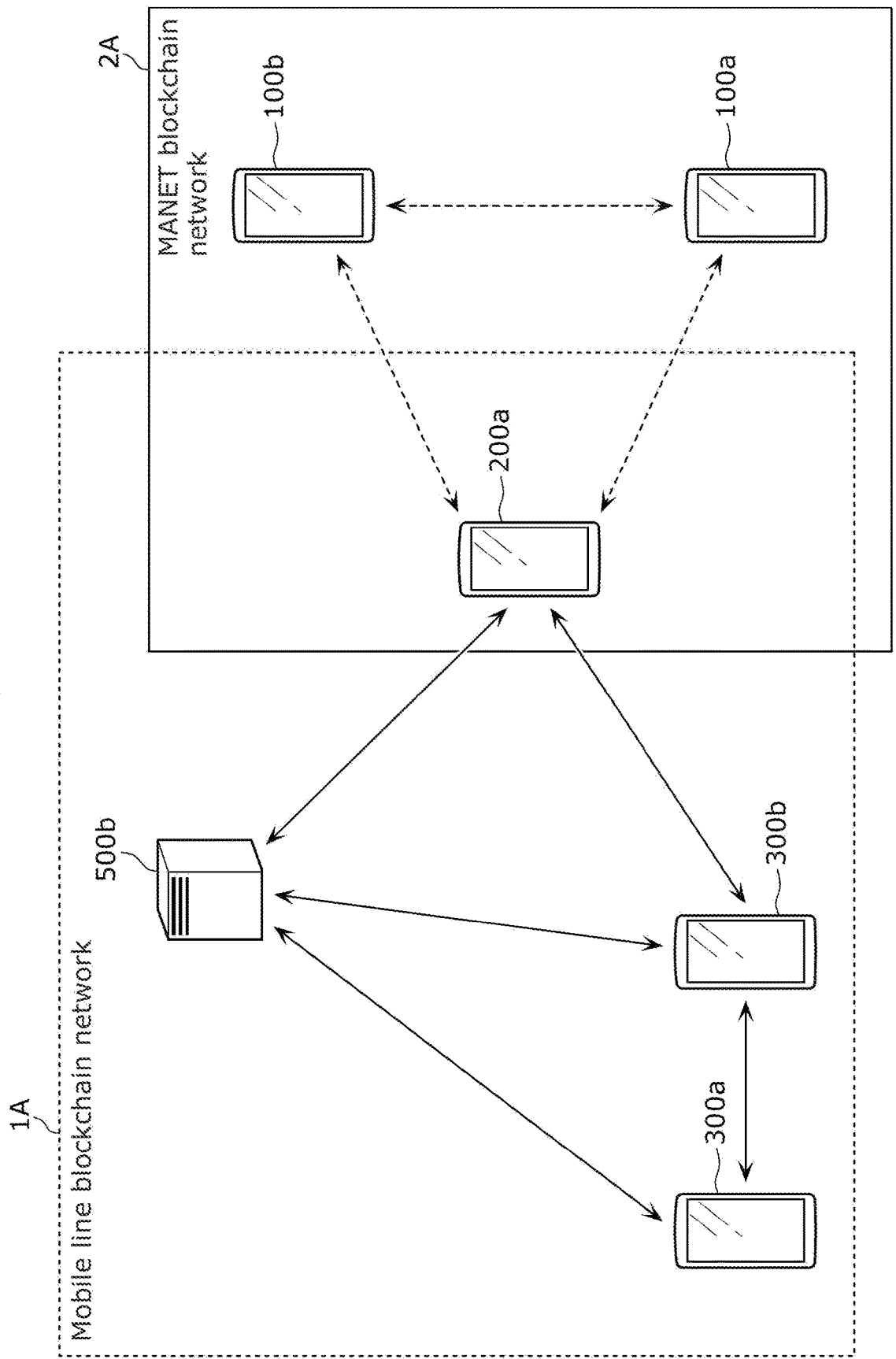
FIG. 2 is a diagram illustrating one example of a configuration including a mobile line blockchain network and a MANET blockchain network according to an exemplary embodiment.

FIG. 2 is a diagram illustrating one example of a configuration including mobile line blockchain network 1A and MANET blockchain network 2A according to an exemplary embodiment.

Mobile line blockchain network 1A is built as an overlay network for mobile network 1. In the example illustrated in FIG. 2, mobile line blockchain network 1A is built as an overlay network using servicer node 500b and mobile nodes 200a, 300a, 300b which are connected to mobile network 1.

MANET blockchain network 2A is built as an overlay network for the MANET. In the example illustrated in FIG. 2, MANET blockchain network 2A is built as an overlay network using mobile nodes 100a, 100b, 200a which are connected to MANET 2.

Note that mobile line blockchain network 1A and MANET blockchain network 2A which are built as overlay networks are independent networks, and mobile node 200a is connected to both mobile line blockchain network 1A and MANET blockchain network 2A.

Furthermore, servicer node 500b can deploy an arbitrary smart contract onto mobile line blockchain network 1A. Moreover, an arbitrary node that participates in mobile line blockchain network 1A can access the smart contract from synchronized data within the blockchain.

In the example illustrated in FIG. 2, mobile nodes 300a, 300b and servicer node 500b access, via the second distributed ledgers thereof, the smart contract deployed by servicer node 500b. Examples of the smart contract deployed by servicer node 500b include a smart contract for providing an incentive for building a MANET, which will be described later.

[1.3 Configuration of Mobile Node 100a]

Since mobile nodes 100a, 100b, 200a, 300a, 300b have substantially the same configuration, the configuration of mobile node 100a will be described as an example.

Figure 3:
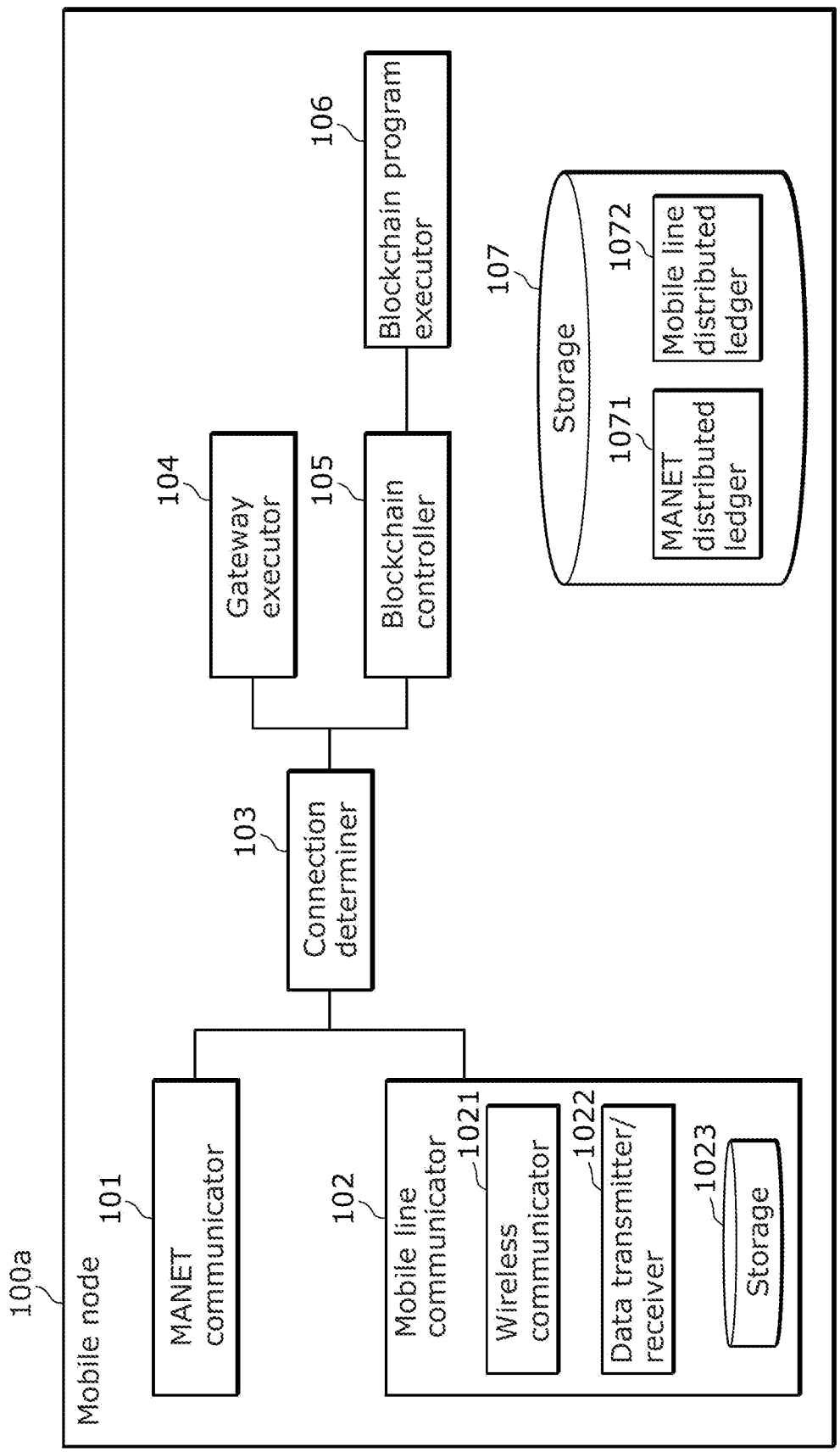
FIG. 3 is a diagram illustrating one example of the overall configuration of a mobile node according to an exemplary embodiment.

FIG. 3 is a diagram illustrating one example of the overall configuration of mobile node 100a according to an exemplary embodiment.

Mobile node 100a includes a processor (not illustrated in the drawings) and memory (not illustrated in the drawings) having stored therein a program for causing the processor to perform a predetermined process. In other words, mobile node 100a is implemented by the processor executing a predetermined program using the memory. Furthermore, as mentioned above, mobile node 100a includes the first distributed ledger and the second distributed ledger and can be connected to the mobile line (mobile network 1). In the present exemplary embodiment, mobile node 100a includes MANET communicator 101, mobile line communicator 102, connection determiner 103, gateway executor 104, blockchain controller 105, blockchain program executor 106, and storage 107, as illustrated in FIG. 3.

[1.3.1 Mobile Line Communicator 102]

Mobile line communicator 102 communicates with mobile network 1. In the present exemplary embodiment, mobile line communicator 102 includes wireless communicator 1021, data transmitter/receiver 1022, and storage 1023, as illustrated in FIG. 3.

<Wireless Communicator 1021>

Wireless communicator 1021 establishes communication with base station 400 and communicates with base station 400 via radio waves. In the present exemplary embodiment, when the communication with base station 400 is established, wireless communicator 1021 determines that the mobile network is online, in other words, mobile network 1 is connected. When the communication with base station 400 is not established, wireless communicator 1021 determines that the mobile network is offline, in other words, mobile network 1 is not connected.

Wireless communicator 1021 records a mobile line connection status, which is information indicating whether mobile network 1 is connected, into storage 1023 together with a timestamp at a fixed interval.

<Data Transmitter/Receiver 1022>

Data transmitter/receiver 1022 performs data communication with base station 400. Specifically, data transmitter/receiver 1022 transmits data such as packets to base station 400 and receives the data from base station 400, for example.

<Storage 1023>

Storage 1023, which includes memory or the like, stores the data that is transmitted and received by data transmitter/receiver 1022 and stores the mobile line connection status together with a time stamp.

[1.3.2 MANET Communicator 101]

Figure 4:
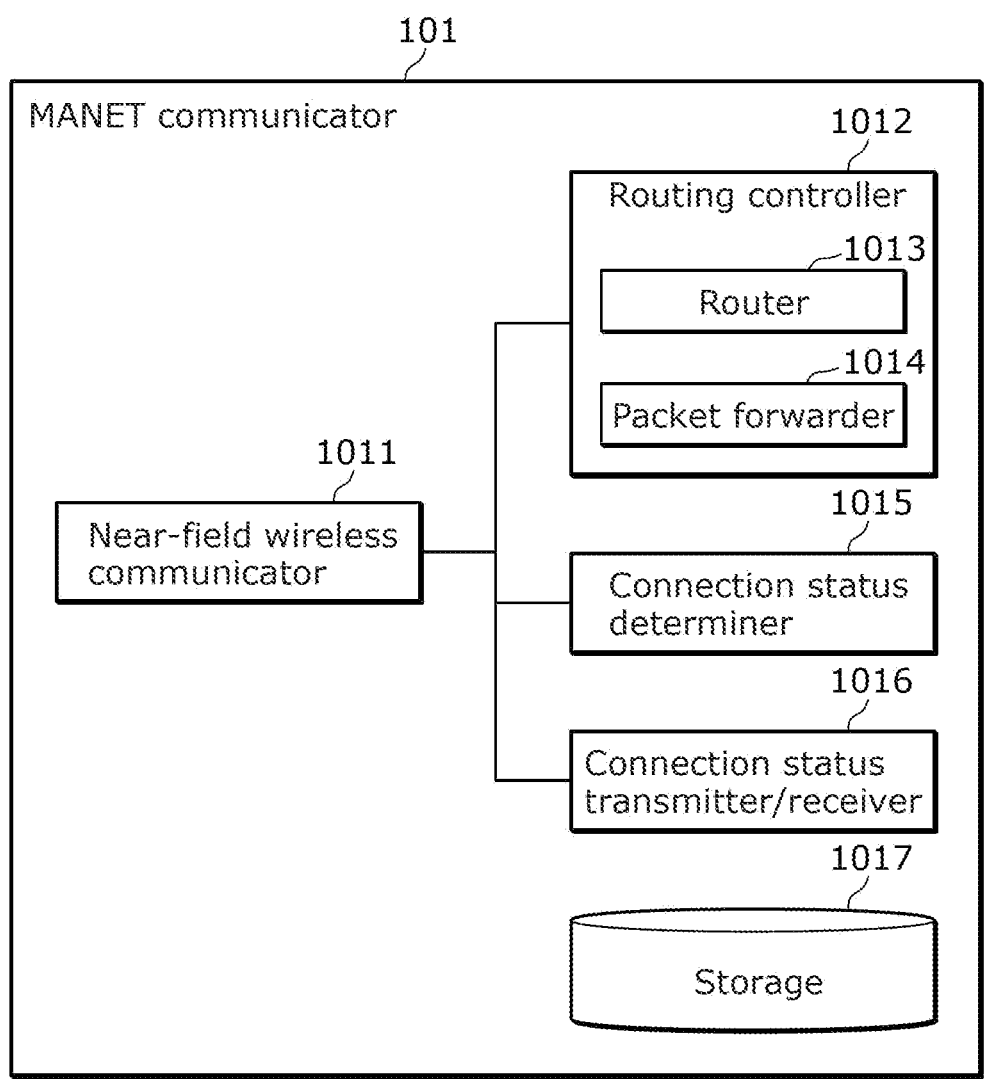
FIG. 4 is a diagram illustrating one example of the detailed configuration of a MANET communicator of the mobile node illustrated in FIG. 3.

FIG. 4 is a diagram illustrating one example of the detailed configuration of MANET communicator 101 of the mobile node illustrated in FIG. 3.

MANET communicator 101 performs the MANET communication using the near-field wireless communication technology. In the present exemplary embodiment, MANET communicator 101 includes near-field wireless communicator 1011, routing controller 1012, communication status determiner 1015, communication status transmitter/receiver 1016, and storage 1017, as illustrated in FIG. 4.

<Near-Field Wireless Communicator 1011>

Near-field wireless communicator 1011 performs near-field wireless communication with a neighbor mobile node located within a predetermined communication distance. In the present exemplary embodiment, near-field wireless communicator 1011 makes a connection request to a neighbor mobile node and is paired with the neighbor mobile node, thereby establishing near-field wireless communication with the neighbor mobile node.

Since the mobile nodes are mobile terminals that are driven by batteries, the near-field wireless communication is preferably performed with low power consumption in order to maintain MANET 2 for a long time. Therefore, near-field wireless communicator 1011 communicates with a neighbor mobile node using Bluetooth (registered trademark) such as Bluetooth Low Energy, which is a near-field wireless communication standard with reduced power consumption and reduced cost, for example. Note that the application of near-field wireless communicator 1011 is not limited to the case where communication with a neighbor mobile node is performed using Bluetooth such as Bluetooth Low Energy. Near-field wireless communicator 1011 may perform communication with a neighbor mobile node using Low Power, Wide Area (LPWA), which is a wireless communication standard that enables long-range data communication with reduced power consumption, such as SigFox and LoRa, for example. Furthermore, near-field wireless communicator 1011 may combine these to communicate with a neighbor mobile node.

Furthermore, when near-field wireless communicator 1011 establishes near-field wireless communication with a neighbor mobile node, near-field wireless communicator 1011 stores information of the neighbor mobile node into storage 1017. For example, near-field wireless communicator 1011 exchanges node identifier information with a mobile node with which near-field wireless communication has been established, and records the obtained identifier into storage 1017.

Furthermore, when near-field wireless communicator 1011 establishes near-field wireless communication with a neighbor mobile node, near-field wireless communicator 1011 may obtain received signal strength indication (RSSI) which is the radio field strength of the near-field wireless communication for the neighbor mobile node. In this case, it is sufficient that near-field wireless communicator 1011 store the obtained RSSI into storage 1017 together with time information. Moreover, using the obtained RSSI, near-field wireless communicator 1011 may estimate the distance between near-field wireless communicator 1011 itself and the neighbor mobile node regardless of whether data has been transmitted to or received from the neighbor mobile node. In this case, it is sufficient that near-field wireless communicator 1011 store the estimated distance into storage 1017 together with time information.

<Routing Controller 1012>

Routing controller 1012 controls a transfer route for packets. Routing controller 1012 includes router 1013 and packet forwarder 1014, as illustrated in FIG. 4.

<Router 1013>

Router 1013 searches for the device address of the neighbor mobile node, creates a routing table on the basis of the result of the search, and searches for a path. Furthermore, router 1013 creates a routing table using information transmitted from other mobile nodes and related to mobile nodes that have established near-field wireless communication with the other mobile nodes.

In the present exemplary embodiment, router 1013 creates a routing table and searches for a path in compliance with the routing protocol of an ad hoc network including the optimized linking state routing (OLSR) disclosed in NPL 1. Router 1013 stores the created routing table into storage 1017 together with the timestamp of the creation.

Note that router 1013 may calculate the network topology of current MANET 2 from the packets for searching for a path broadcast to entire MANET 2 and create the routing table.

Furthermore, when the network topology of MANET 2 changes, router 1013 updates the routing table stored in storage 1017.

<Packet Forwarder 1014>

Using the routing table created by router 1013, packet forwarder 1014 relays communication content such as data that is transmitted and received by near-field wireless communicator 1011 to a destination node included in the communication content. More specifically, when the destination node included in the communication content of near-field wireless communicator 1011 is known in the immediately previous routing table created by router 1013, packet forwarder 1014 relays said communication content to the destination node. On the other hand, when the destination node is not known, packet forwarder 1014 transmits, to connection determiner 103, a result indicating that the destination node has not been registered in the routing table.

Furthermore, packet forwarder 1014 broadcasts, to entire MANET 2, information of mobile nodes that have established near-field wireless communication. Moreover, packet forwarder 1014 broadcasts the packets for searching for a path to entire MANET 2.

<Connection Status Determiner 1015>

Connection status determiner 1015 determines the connection status of near-field wireless communicator 1011. In the present exemplary embodiment, when there is at least one neighbor mobile node that has been paired by near-field wireless communicator 1011, connection status determiner 1015 determines that the MANET is connected, in other words, near-field wireless communication has been established. On the other hand, when there is no neighbor mobile node that has been paired by near-field wireless communicator 1011, connection status determiner 1015 determines that the MANET is not connected, in other words, no near-field wireless communication has been established.

Connection status determiner 1015 records a MANET connection status, which is information indicating whether or not the MANET is connected, into storage 1017 at a fixed interval.

<Connection Status Transmitter/Receiver 1016>

Connection status transmitter/receiver 1016 transmits and receives a mobile line connection status, which is information indicating whether the mobile line is connected, to and from each of one or more second mobile nodes, which are one or more mobile nodes other than the first mobile node among the plurality of mobile nodes, via the near-field wireless communication. In other words, connection status transmitter/receiver 1016 exchanges, with a paired neighbor mobile node, the mobile line connection status that is information indicating whether mobile network 1 is connected. In the present exemplary embodiment, connection status transmitter/receiver 1016 requests a neighbor mobile node paired by near-field wireless communicator 1011 to transmit thereto the mobile line connection status of said neighbor mobile node, and receives the mobile line connection status of said neighbor mobile node. Connection status transmitter/receiver 1016 stores the received mobile line connection status of said neighbor mobile node into storage 1017. Furthermore, connection status transmitter/receiver 1016 transmits the mobile line connection status of the mobile node itself stored in storage 1023 to the neighbor mobile node paired by near-field wireless communicator 1011.

<Storage 1017>

Storage 1017 includes memory or the like. Storage 1017 stores the information of mobile nodes obtained by near-field wireless communicator 1011, stores, together with time information, the RSSI obtained by near-field wireless communicator 1011, and stores, together with time information, the distance estimated by near-field wireless communicator 1011, for example. Furthermore, storage 1017 stores the routing table created by router 1013, together with the timestamp of the creation, and stores the mobile line connection status of a mobile node received by connection status transmitter/receiver 1016, for example.

Thus, MANET communicator 101 builds a MANET using the first mobile node and the one or more second mobile nodes on the basis of the first mobile line connection status of the first mobile node and the second mobile line connection status of each of the one or more second mobile nodes.

[1.3.2.1 Execution Procedure Applied to Build Stand-Alone MANET]

The following describes procedures that are executed by MANET communicator 101 in the case where seven mobile nodes 100a, 100b, 100c, 100d, 100d, 100f, 100g build a stand-alone MANET. Note that mobile nodes 100a, 100b, 100c, 100d, 100e, 100f, 100g will be referred to as a plurality of mobile nodes 100.

Figures 5, 6:
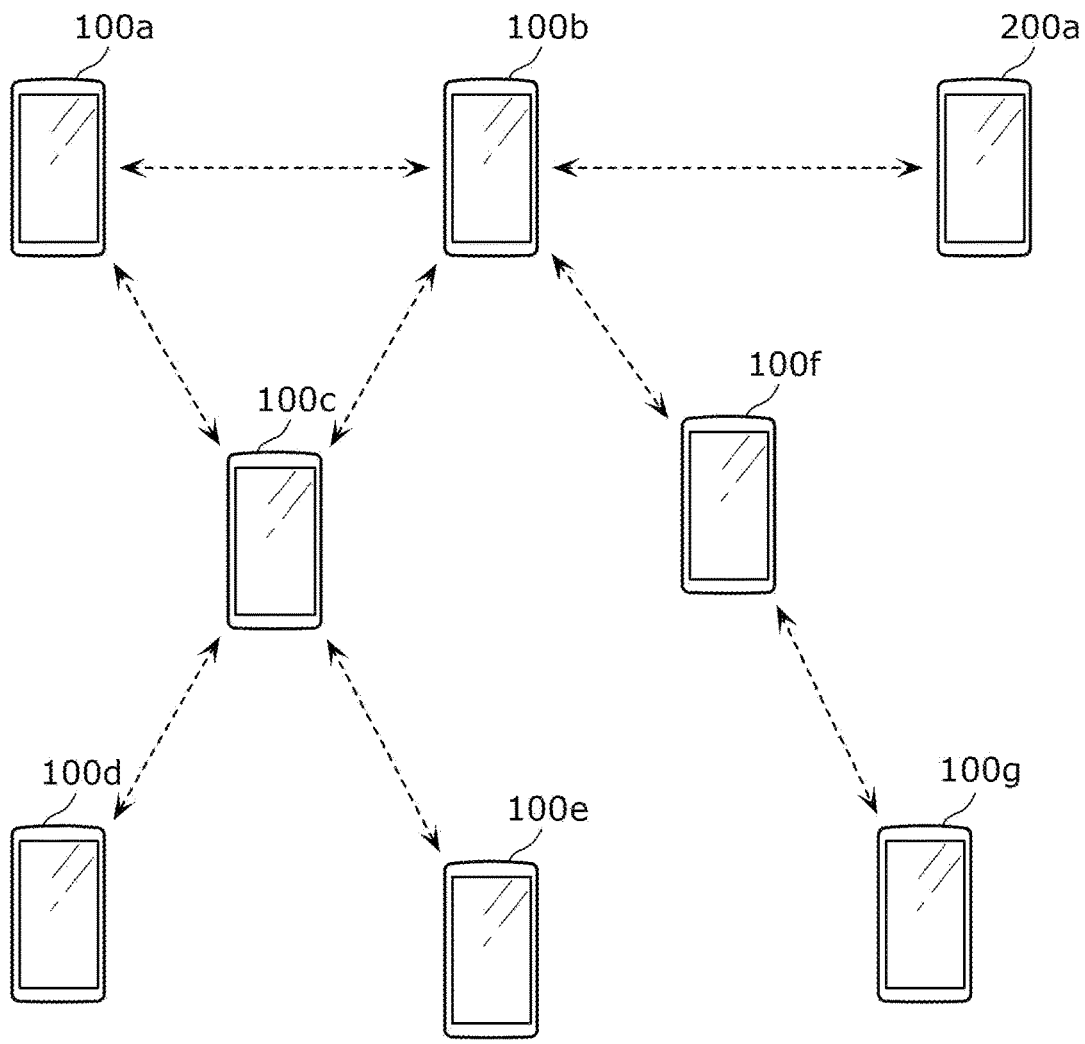
FIG. 5 is a diagram illustrating one example of the network topology of a MANET according to an exemplary embodiment.
FIG. 6 is a diagram illustrating adjacent mobile nodes in the MANET illustrated in FIG. 5.

FIG. 5 is a diagram illustrating one example of the network topology of MANET 2 according to an exemplary embodiment. FIG. 6 is a diagram illustrating adjacent mobile nodes in MANET 2 illustrated in FIG. 5.

First, each of the plurality of mobile nodes 100 creates a routing table and searches for a path by MANET communicator 101. On the basis of the result of the search for a path, each of the plurality of mobile nodes 100 makes a connection request to neighbor mobile node 100 and is paired with neighbor mobile node 100, thereby establishing near-field wireless communication with neighbor mobile node 100. Each of the plurality of mobile nodes 100 directly communicates with a neighbor mobile node that is mobile node 100 with which the near-field wireless communication has been established, and stores the information of the neighbor mobile node into storage 1017.

In the example illustrated in FIG. 5, the neighbor mobile nodes for mobile node 100a are mobile node 100b and mobile node 100c. This is indicated in FIG. 6 where mobile node 100a is a reference point mobile node.

Similarly, neighbor mobile nodes for mobile node 100b as a reference point mobile node are mobile nodes 100a, 100c, 100f and mobile node 200a, as indicated in FIG. 6. Neighbor mobile nodes for mobile node 100c as a reference point mobile node are mobile nodes 100a, 100b, 100d, 100e. Similarly, a neighbor mobile node for mobile node 100d as a reference point mobile node is mobile node 100c, and a neighbor mobile node for mobile node 100e as a reference point mobile node is mobile node 100c. Neighbor mobile nodes for mobile node 100f as a reference point mobile node are mobile nodes 100b, 100g, and a neighbor mobile node for mobile node 100g as a reference point mobile node is mobile node 100f.

Note that the table illustrated in FIG. 6 is created using information of neighbor mobile nodes for the current mobile node and information of neighbor mobile nodes that has been broadcast by each of the plurality of mobile nodes 100 except for the current mobile node. Subsequently, a network topology is calculated on the basis of the table illustrated in FIG. 6.

Figures 7, 8:
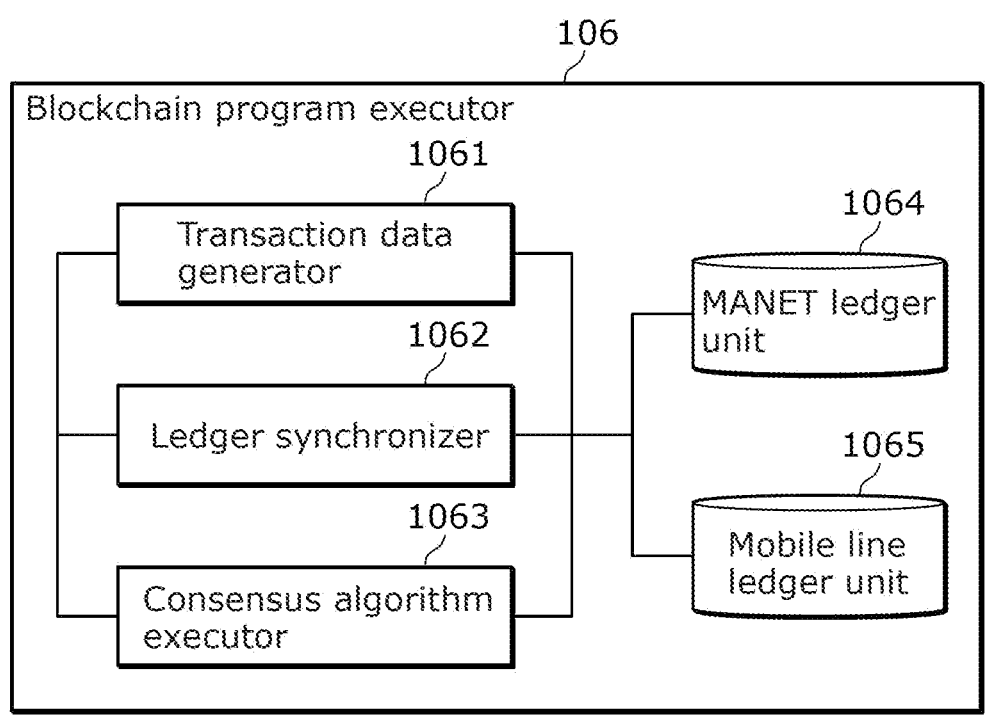
FIG. 7 is a diagram illustrating one example of the routing table of a mobile node according to an exemplary embodiment.
FIG. 8 is a diagram illustrating one example of the detailed configuration of a blockchain program executor illustrated in FIG. 3.

FIG. 7 is a diagram illustrating one example of the routing table of a mobile node according to an exemplary embodiment. FIG. 7 illustrates one example of the routing table created by mobile node 100c illustrated in FIG. 5 in conformity with the OLSR protocol.

Note that FIG. 7 illustrates one example of the routing table that is created by mobile node 100c on the basis of the result of multi-hop transmission of packets for searching for a path and broadcasting (flooding) of the packets to entire MANET 2. This routing table is created by recording the identifier of mobile node 100 subject to the first hop in the case where mobile node 100c transmits packets to another mobile node 100 connected to the stand-alone MANET illustrated in FIG. 5 with the minimum number of hops. In other words, in the next hop-hop node illustrated in FIG. 7, a mobile node subject to the first hop in the multi-hop transmission to a destination node is recorded.

This routing table is updated when the network topology of MANET 2 changes.

The description will continue with reference back to FIG. 3.

[1.3.3 Connection Determiner 103]

Connection determiner 103 determines whether mobile node 100a performs MANET communication and whether mobile node 100a is connected to mobile network 1. More specifically, by checking the mobile line connection status stored in storage 1023 of mobile line communicator 102, connection determiner 103 can determine whether mobile node 100a is connected to mobile network 1. Furthermore, by checking the MANET connection status stored in storage 1017 of MANET communicator 101, which indicates whether or not the MANET is connected, connection determiner 103 can determine whether mobile node 100a performs MANET communication.

In the present exemplary embodiment, for example, when the MANET is connected and mobile node 100a is connected to mobile network 1, connection determiner 103 causes gateway executor 104 to perform a gateway process. On the other hand, for example, when the MANET is connected, but mobile node 100a is not connected to mobile network 1, connection determiner 103 does not cause gateway executor 104 to perform the gateway process.

Furthermore, on the basis of the MANET connection status, the mobile line connection status, and the communication content, connection determiner 103 causes blockchain program executor 106 to operate.

[1.3.4 Gateway Executor 104]

When the MANET is connected and mobile node 100a is connected to mobile network 1 (the mobile network is online), gateway executor 104 performs the gateway process of relaying packets. For example, when gateway executor 104 obtains, from MANET communicator 101, transmission data and a destination node not known in the routing table, gateway executor 104 transmits the transmission data to mobile network 1 via mobile line communicator 102. Note that when the MANET is connected, but mobile node 100a is not connected to mobile network 1 (the mobile network is offline), gateway executor 104 does not perform the gateway process.

[1.3.5 Blockchain Controller 105]

When the MANET is connected, blockchain controller 105 causes blockchain program executor 106 to connect to MANET blockchain network 2A and update MANET distributed ledger 1071. Furthermore, when the mobile network is online, blockchain controller 105 causes blockchain program executor 106 to connect to mobile line blockchain network 1A and update mobile line distributed ledger 1072.

In the present exemplary embodiment, when the MANET is connected and the mobile network is offline, blockchain controller 105 causes blockchain program executor 106 to operate for MANET blockchain network 2A. Subsequently, when the mobile network changes to be online while the MANET remains connected, blockchain controller 105 causes blockchain program executor 106 to operate for mobile line blockchain network 1A and MANET blockchain network 2A independently.

Note that when the MANET is not connected and the mobile network is online, blockchain controller 105 causes the blockchain program executor to operate for mobile line blockchain network 1A.

[1.3.6 Blockchain Program Executor 106]

FIG. 8 is a diagram illustrating one example of the detailed configuration of blockchain program executor 106 illustrated in FIG. 3. Blockchain program executor 106 includes transaction data generator 1061, ledger synchronizer 1062, consensus algorithm executor 1063, MANET ledger unit 1064, and mobile line ledger unit 1065, as illustrated in FIG. 8.

<Transaction Data Generator 1061>

Transaction data generator 1061 generates transaction data including information such as the MANET routing information and a timestamp added to said information. The transaction data is transaction information written to a blockchain.

The MANET routing information, which is used to indicate the position and role of a mobile node in the network topology of MANET 2, indicates the MANET connection status of the mobile node. The MANET routing information may be a routing table, for example, and may include an identifier indicating each of one or more mobile nodes that perform near-field wireless communication with mobile node 100a in MANET 2. In the present exemplary embodiment, the MANET connection status of a mobile node is information of the network topology of a connecting MANET, for example.

Note that the MANET routing information may further include information regarding the radio field strength of near-field wireless communication or may further include distance information regarding the distance between mobile nodes that have established near-field wireless communication.

Information included in the transaction data is not limited to the MANET routing information and may be a smart contract converted into a format in which the smart contract can be recorded into the transaction data or may be an incentive such as a crypto token. Information included in the transaction data may be information obtained by compressing the entire ledger information recorded in the first distributed ledger for MANET blockchain network 2A, that is, MANET distributed ledger 1071, and adding the timestamp of this time to the compressed ledger information.

<Ledger Synchronizer 1062>

Ledger synchronizer 1062 selects at least one of MANET ledger unit 1064 and mobile line ledger unit 1065 according to the MANET connection status and the mobile line connection status, and synchronizes the distributed ledger for MANET blockchain network 2A or mobile line blockchain network 1A.

Note that when the smart contract is deployed on a blockchain network, an address on the blockchain network is allocated thereto. All the mobile nodes that participate in the blockchain network can execute the smart contract by issuing transaction data to the address of the smart contract.

<Consensus Algorithm Executor 1063>

Consensus algorithm executor 1063 generates a block according to a consensus algorithm executed by all the blockchain nodes including consensus algorithm executors that participate in the blockchain network. At the time of generating a block, consensus algorithm executor 1063 includes new transaction data into the block.

In other words, transaction data is recorded into the distributed ledger as a block including said transaction data that has been generated through execution of the consensus algorithm.

<MANET Ledger Unit 1064>

MANET ledger unit 1064 controls the first distributed ledger for MANET blockchain network 2A. MANET ledger unit 1064 holds at least one unique address on MANET blockchain network 2A and performs the control of recording data of a block or the like into MANET distributed ledger 1071. This address is an account on the MANET blockchains and is used as an identifier that identifies the source of transaction data or the destination of an incentive.

In the present exemplary embodiment, MANET ledger unit 1064 records a block including transaction data into the first distributed ledger, namely, MANET distributed ledger 1071, on the basis of the result of the selection made by ledger synchronizer 1062.

<Mobile Line ledger Unit 1065>

Mobile line ledger unit 1065 controls the second distributed ledger for mobile line blockchain network 1A. Mobile line ledger unit 1065 holds at least one unique address on the mobile line blockchain network and performs the process of recording data of a block or the like into mobile line distributed ledger 1072. This address is an account on the mobile line blockchains and is used as an identifier that identifies the source of transaction data or the destination of an incentive.

In the present exemplary embodiment, mobile line ledger unit 1065 records a block including transaction data into the second distributed ledger, namely, mobile line distributed ledger 1072, on the basis of the result of the selection made by ledger synchronizer 1062.

[1.3.7 Storage 107]

Storage 107 is a storage device in which a distributed ledger for blockchains is stored. In the distributed ledger stored in storage 107, one or more smart contracts are stored. Storage 107 is provided as a hard disk drive or a solid-state drive, for example.

As illustrated in FIG. 3, MANET distributed ledger 1071 and mobile line distributed ledger 1072 are stored in the storage area of storage 107. MANET distributed ledger 1071 and mobile line distributed ledger 1072 are independently synchronized and updated.

MANET distributed ledger 1071 corresponds to the first distributed ledger for blockchains in MANET 2, that is, the first distributed ledger for MANET blockchain network 2A.

Mobile line distributed ledger 1072 corresponds to the second distributed ledger for blockchains in mobile network 1, that is, a distributed ledger for mobile line blockchain network 1A.

[1.4 Configuration of Servicer Node 500b]

Next, the configuration of servicer node 500b will be described.

Figure 9:
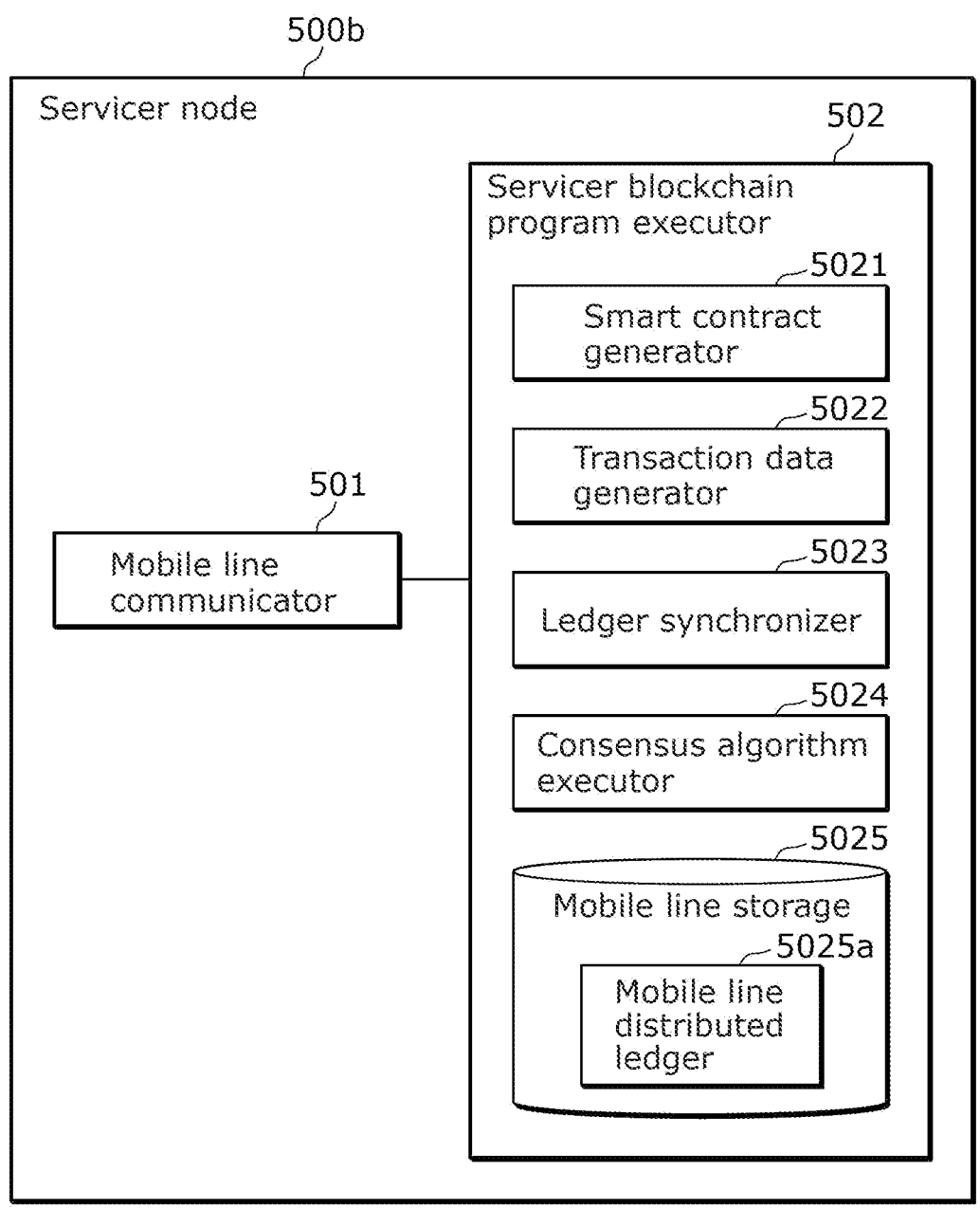
FIG. 9 is a diagram illustrating one example of the overall configuration of a servicer node according to an exemplary embodiment.

FIG. 9 is a diagram illustrating one example of the overall configuration of servicer node 500b according to an exemplary embodiment. Servicer node 500b includes mobile line communicator 501 and servicer blockchain program executor 502, as illustrated in FIG. 9. Thus, since servicer node 500b includes mobile line communicator 501 only, servicer node 500b is connected to mobile line blockchain network 1A only <Mobile Line Communicator 501>

Mobile line communicator 501 includes substantially the same functions as mobile line communicator 102 illustrated in FIG. 3 and therefore, description thereof will not be repeated here.

<Servicer Blockchain Program Executor 502>

Servicer blockchain program executor 502 operates only for mobile line blockchain network 1A. Servicer blockchain program executor 502 includes smart contract generator 5021, transaction data generator 5022, ledger synchronizer 5023, consensus algorithm executor 5024, and mobile line storage 5025, as illustrated in FIG. 9.

Note that transaction data generator 5022, ledger synchronizer 5023, and consensus algorithm executor 5024 include substantially the same functions as transaction data generator 1061, ledger synchronizer 1062, and consensus algorithm executor 1063 illustrated in FIG. 8 and therefore, description thereof will not be repeated here.

<Smart Contract Generator 5021>

Smart contract generator 5021 generates a smart contract defining an arbitrary algorithm and constants and variables thereof and converts the smart contract into a format in which the smart contract can be recorded into the transaction data.

For example, smart contract generator 5021 may binarize the generated smart contract to convert the smart contract into a format in which the smart contract can be recorded into the transaction data. In this case, binary data generated by smart contract generator 5021 is handed over to transaction data generator 5022. Subsequently, smart contract generator 5021 issues (in other words, transmits) transaction data including the binary data to mobile line blockchain network 1A.

In the present exemplary embodiment, the servicer causes smart contract generator 5021 to generate a smart contract for providing an incentive (hereinafter referred to as an incentive contract) to a mobile node that has contributed to building a connecting MANET when mobile network 1 is disrupted. Moreover, the servicer causes smart contract generator 5021 to deploy said incentive contract onto mobile line blockchain network 1A.

Note that this incentive contract is a smart contract used to provide, in accordance with an incentive allocation rule based on the degrees of contribution, an incentive to a mobile node that has contributed to building a connecting MANET when mobile network 1 is disrupted. With the deployed incentive contract, the degree of contribution to the network topology of the connecting MANET can be calculated using the MANET routing information of MANET 2 at the moment of transition from the stand-alone MANET to the connecting MANET. Subsequently, an incentive corresponding to the calculated degree of contribution is provided to the mobile node.

In this manner, by way of the deployed incentive contract, an incentive can be automatically provided to a mobile node that has contributed to building a connecting MANET when mobile network 1 is disrupted.

<Mobile Line Storage 5025>

Mobile line storage 5025 is a storage device in which mobile line distributed ledger 5025a, which is a distributed ledger for mobile line blockchain network 1A, is stored. Mobile line storage 5025 is provided as a hard disk drive or a solid-state drive, for example.

In mobile line distributed ledger 5025a, one or more smart contracts are stored. Mobile line distributed ledger 5025a corresponds to the second distributed ledger for blockchains in mobile network 1, that is, a distributed ledger for mobile line blockchain network 1A.

[1.4.1 Flow Until Incentive is Provided According to Incentive Contract]

Next, the flow until an incentive is provided according to the incentive contract will be described.

First, before disruption of mobile network 1 occurs, servicer node 500b generates an incentive contract and deploys the generated incentive contract to mobile line blockchain network 1A.

Subsequently, when disruption of mobile network 1 occurs, a plurality of mobile nodes located in the area of outage such as mobile nodes 100a, 100b, 200a build a stand-alone MANET, for example. Mobile node 100a and the like that have built the stand-alone MANET create a routing table and generate MANET routing information which is used to indicate the position and role of a mobile node in the network topology of the stand-alone MANET. Subsequently, mobile node 100a and the like that have built the stand-alone MANET generate transaction data including the MANET routing information and the timestamp of update of the MANET routing information.

When all of mobile node 100a and the like included in the stand-alone MANET are not connected to mobile network 1, only MANET blockchain network 2A is established, and mobile line blockchain network 1A is not established.

In this case, one mobile node included in the stand-alone MANET issues the generated transaction data to MANET blockchain network 2A and records the generated transaction data into the first distributed ledger, namely, MANET distributed ledger 1071. MANET distributed ledger 1071 in which the issued transaction data is recorded is synchronized in all of mobile node 100a and the like located in MANET blockchain network 2A. When a consensus is reached among all of mobile node 100a and the like located in MANET blockchain network 2A, said one mobile node retrieves the transaction data into a block and broadcasts the block to entire MANET blockchain network 2A.

Next, assume that one mobile node included in the stand-alone MANET, that is, for example, mobile node 200a, is successfully connected to mobile network 1 as a result of geographical movement.

In this case, mobile node 200a generates and issues transaction data directed to the address of the incentive contract by compressing the ledger information recorded in the first distributed ledger, namely, MANET distributed ledger 1071, and adding a timestamp thereto. Thus, said transaction data is recorded in the second distributed ledger, namely, mobile line distributed ledger 1072. This means that said ledger information is recorded in the first distributed ledger for MANET blockchain network 2A and the second distributed ledger for mobile line blockchain network 1A.

Mobile node 200a plays the role of a gateway as mobile node 200a can cause the stand-alone MANET to transition into the connecting MANET.

When the stand-alone MANET transitions into the connecting MANET, all of mobile node 100a and the like included in the connecting MANET can perform mobile network communication. Therefore, all of mobile node 100a and the like included in the connecting MANET can be connected to mobile line blockchain network 1A through the gateway process and thus can synchronize the second distributed ledger with the latest ledger information.

The transaction data including the incentive that has been issued according to the incentive contract is also synchronized at the timing of the synchronization with the latest ledger information. Specifically, when the stand-alone MANET transitions to the connecting MANET, the MANET routing information including information of the network topology of the connecting MANET is synchronized with the second distributed ledger for mobile line blockchain network 1A via mobile node 200a. This MANET routing information is then included in the transaction data and the transaction data is issued to the incentive contract. On the basis of the MANET routing information included in the issued transaction data, the incentive contract autonomously calculates the ratio of the degrees of contribution of mobile node 100a and the like to building the MANET at the time of transition to the connecting MANET.

In this manner, after the transaction data including the MANET routing information at the time of transition to the connecting MANET is recorded into the second distributed ledger, incentives are provided to mobile node 100a and the like according to the degrees of contribution thereof to building the MANET that have been calculated on the basis of said MANET routing information. This means that mobile node 100a and the like receive incentives corresponding to the degrees of contribution thereof to building the connecting MANET.

Note that when the MANET routing information includes an identifier indicating each of the one or more second mobile nodes that performs the near-field wireless communication with the first mobile node in the MANET, an incentive proportional to the total number of identifiers included in the MANET routing information may be provided to the first mobile node. Furthermore, when the MANET routing information includes distance information regarding the distance between the first mobile node and each of the one or more second mobile nodes, a greater incentive may be provided to a second mobile node located at a greater distance from the first mobile node. Furthermore, when the MANET routing information includes information regarding the radio field strength of the near-field wireless communication performed between the first mobile node and each of the one or more second mobile nodes, a greater incentive may be provided to a second mobile node that performs the near-field wireless communication at lower radio field strength with the first mobile node.

[1.4.2 Incentive Allocation Rule of Incentive Contract]

Next, the incentive allocation rule applied to the incentive contract will be described.

Examples of the disruption of mobile network 1 include cases where the mobile network communication has become unavailable due to collapse of base station 400 caused by disaster. In the case of building a connecting MANET as an alternative communication means for an area of outage where mobile network 1 has been disrupted, a possible ideal condition of the network topology may be that there are a large number of mobile nodes connected to the connecting MANET. Therefore, as an incentive allocation rule, a greater incentive may be provided to a mobile node among the mobile nodes in the MANET that plays the role of a hub serving as a relay point for packet transfer. Note that as an incentive allocation rule, a greater incentive may be provided to a mobile node that has contributed more to enlarge the coverage in the area of outage.

Figures 10, 11:
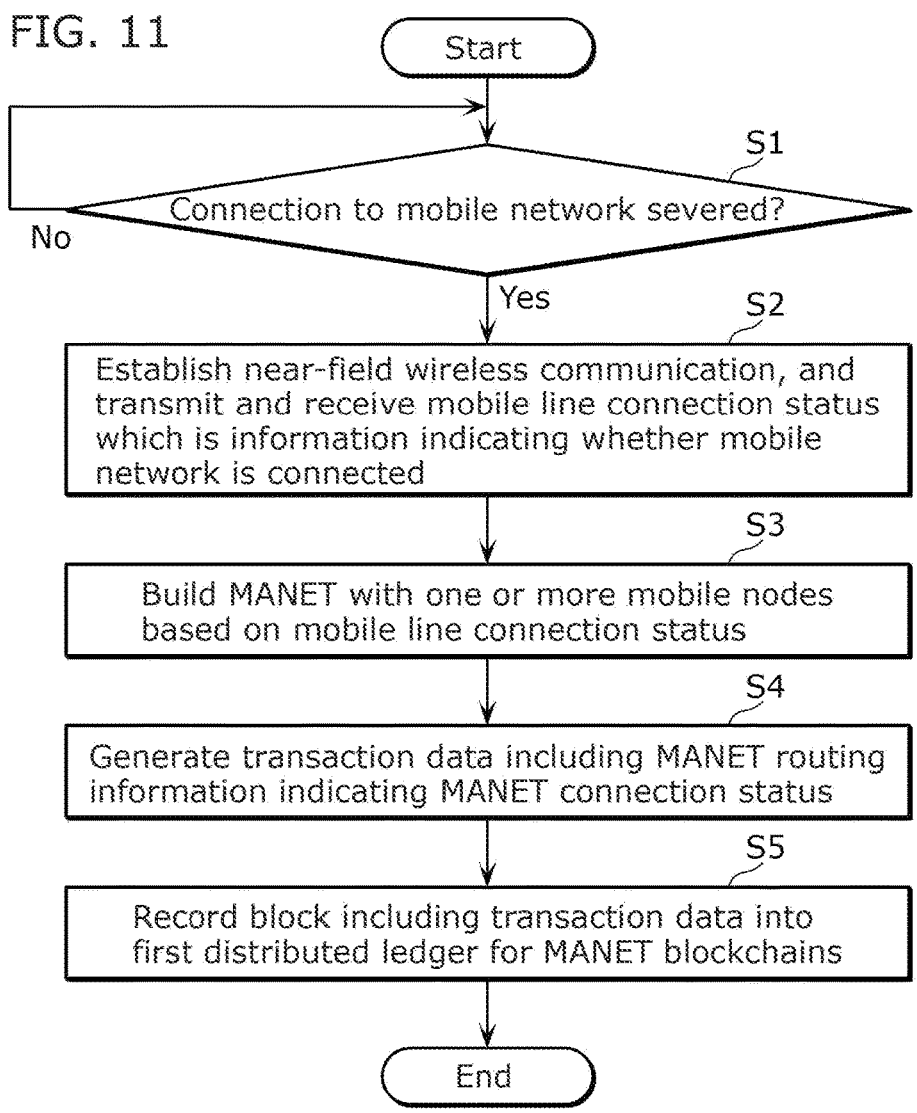
FIG. 10 is a diagram for describing an incentive allocation ratio applied to an incentive contract according to an exemplary embodiment.
FIG. 11 is a flowchart illustrating the outline of the operation of a first mobile node included in a system according to the present disclosure.

FIG. 10 is a diagram for describing one example of the inceptive allocation rule applied to the incentive contract according to an exemplary embodiment. FIG. 10 illustrates one example of a format in which the routing table of all the mobile nodes located in MANET 2 and the ratio of the degrees of contribution are held in the incentive contract. In other words, FIG. 10 illustrates one example of the result obtained when the incentive contract obtains the routing table of all the mobile nodes, such as mobile node 100a, located in MANET 2 and then calculates the ratio of the degrees of contribution.

As illustrated in FIG. 10, the routing table includes 42 combinations that reach neighbor hop destinations. There are 18 combinations that reach mobile node 100c, 11 combinations that reach mobile node 100b, 8 combinations that reach mobile node 100f, 2 combinations that reach mobile node 100a, 1 combination that reaches mobile node 100d, 1 combination that reaches mobile node 100e, and 1 combination that reaches mobile node 100g.

In the case where the degree of contribution of a mobile node that plays a greater hub role is given a larger value, the degree of contribution can be indicated by the ratio of the number of combinations in which each mobile node is a neighbor hop destination in the numerator to the total number of neighbor hop destinations in the denominator. Therefore, this ratio may be used as the incentive allocation ratio.

In other words, the total number of neighbor hop destinations is the total number of combinations of the shortest hop paths through which a mobile node included in the MANET transfers a packet to another mobile node. This total number is referred to as an overall number; then, the ratio calculated by dividing the number of patterns in which an arbitrary mobile node plays the role of a hub for another mobile node in the network topology by the overall number is the incentive allocation ratio. In the example illustrated in FIG. 10, the incentive allocation ratio is proportional to the number of identifiers included in the routing table.

Note that the foregoing describes an example of a case where in the calculation of the ratio of the degrees of contribution to building a MANET, a mobile node that plays the role of a hub is selected on the basis of the MANET routing information and a great incentive is provided to said mobile node, but this is not limiting. For example, GPS position information of mobile nodes may be exchanged via near-field wireless communication, thus the geographical distance between the mobile nodes may be calculated, and greater incentives may be provided as the standard deviation of said geographical distance is smaller.

Furthermore, since it is sufficient that the incentive allocation ratio be used to promote formation of the network topology of a target MANET, the incentive allocation ratio is not limited to that calculated on the basis of the number of identifiers included in the routing table. The incentive allocation ratio may be calculated on the basis of the contribution to the redundancy of the network topology, may be calculated on the basis of the geographical distance between mobile nodes, or may be calculated on the basis of the radio field strength between mobile nodes. In the case of the calculation on the basis of the geographical distance, a greater incentive may be provided as the distance between the mobile nodes increases because the coverage area in the area of outage can increase. As the radio field strength between the mobile nodes decreases, a greater incentive may be provided because the coverage area in the area of outage can increase.

Note that in the present exemplary embodiment, a crypto token may be used as an incentive. In this case, it is sufficient that the incentive contract transmit the crypto token held by servicer node 500*b* at an address in mobile line blockchain network 1A to a unique address held by each mobile node in mobile line blockchain network 1A. For example, assume that 100 units of crypto tokens are linked with the address of servicer node 500*b*. In this case, 4.76 units, 26.2 units, 42.9 units, 2.38 units, 2.38 units, 19.0 units, and 2.38 units of crypt tokens are provided to the addresses of mobile nodes 100*a*, 100*b*, 100*c*, 100*d*, 100*e*, 100*f*, 100*g* in the mobile line blockchains according to the degrees of contribution indicated in FIG. 10. This means that a greater incentive is provided to a mobile node that plays a greater hub role to transfer a packet in a connecting MANET. The crypto tokens are provided by broadcasting transaction data including the crypto tokens that have been generated by the incentive contract onto mobile line blockchain network 1A.

[1.5 Outline of Operation]

Next, among a plurality of mobile nodes included in a system according to the present disclosure, a mobile node disconnected from mobile network 1 will be referred to as a first mobile node, and the outline of the operation of the first mobile node will be described.

FIG. 11 is a flowchart illustrating the outline of the operation of the first mobile node included in the system according to the present disclosure.

First, the first mobile node detects whether mobile network 1 has been disconnected (S1).

When mobile network 1 is disrupted and the connection of the first mobile node to mobile network 1 is severed in Step S1 (Yes in S1), the processing proceeds to Step S2. Note that when the connection of the first mobile node to mobile network 1 is not severed (No in S1), the processing does not proceed to Step S2. Therefore, the severing of the connection of the first mobile node to mobile network 1 triggers the transition to Step S2.

Next, the first mobile node establishes near-field wireless communication and transmits and receives, to and from the one or more second mobile nodes, mobile line connection status which is information indicating whether mobile network 1 is connected (S2). The one or more second mobile nodes are one or more mobile nodes other than the first mobile node among the plurality of mobile nodes included in the system according to the present disclosure. More specifically, the first mobile node transmits and receives a mobile line connection status, which is information indicating whether mobile network 1 is connected, to and from each of the one or more second mobile nodes via near-field wireless communication.

Next, the first mobile node builds a MANET with one or more mobile nodes on the basis of the mobile line connection status (S3). More specifically, the first mobile node builds a MANET with the one or more second mobile nodes on the basis of the first mobile line connection status of the first mobile node and the second mobile line connection status of each of the one or more second mobile nodes.

Next, the first mobile node generates transaction data including MANET routing information indicating a MANET connection status (S4). More specifically, after building the MANET, the first mobile node generates first transaction data including at least first MANET routing information indicating the MANET connection status of the first mobile node. Here, the first MANET routing information is MANET routing information used to indicate the position and role of each of the first mobile node and the one or more second mobile nodes in the network topology of MANET 2.

Next, the first mobile node records a block including the transaction data into the first distributed ledger for MANET blockchains (S5). More specifically, the first mobile node records a block including the first transaction data into MANET distributed ledger 1071 which is the first distributed ledger for MANET blockchain network 2A.

In this manner, when disruption of mobile network 1 occurs, for example, the first mobile node located in the area of outage builds a stand-alone MANET with other mobile nodes located in the area of outage. Subsequently, the first mobile node can record the MANET routing information into the first distributed ledger, namely, MANET distributed ledger 1071, by including the MANET routing information into the transaction data and issuing the transaction data.

This means that a mobile node that is not connected to mobile network 1 can record the MANET routing information into the first distributed ledger by building a MANET; thus, the degree of contribution to the network topology at the time of building the MANET can be recorded in a tamper-proof format. Therefore, a user of a mobile node can expect that an incentive corresponding to the degree of contribution recorded in the distributed ledger will be provided, for example, and thus geographically moves the mobile node that is not connected to mobile network 1 to build a stand-alone MANET.

Figure 12:
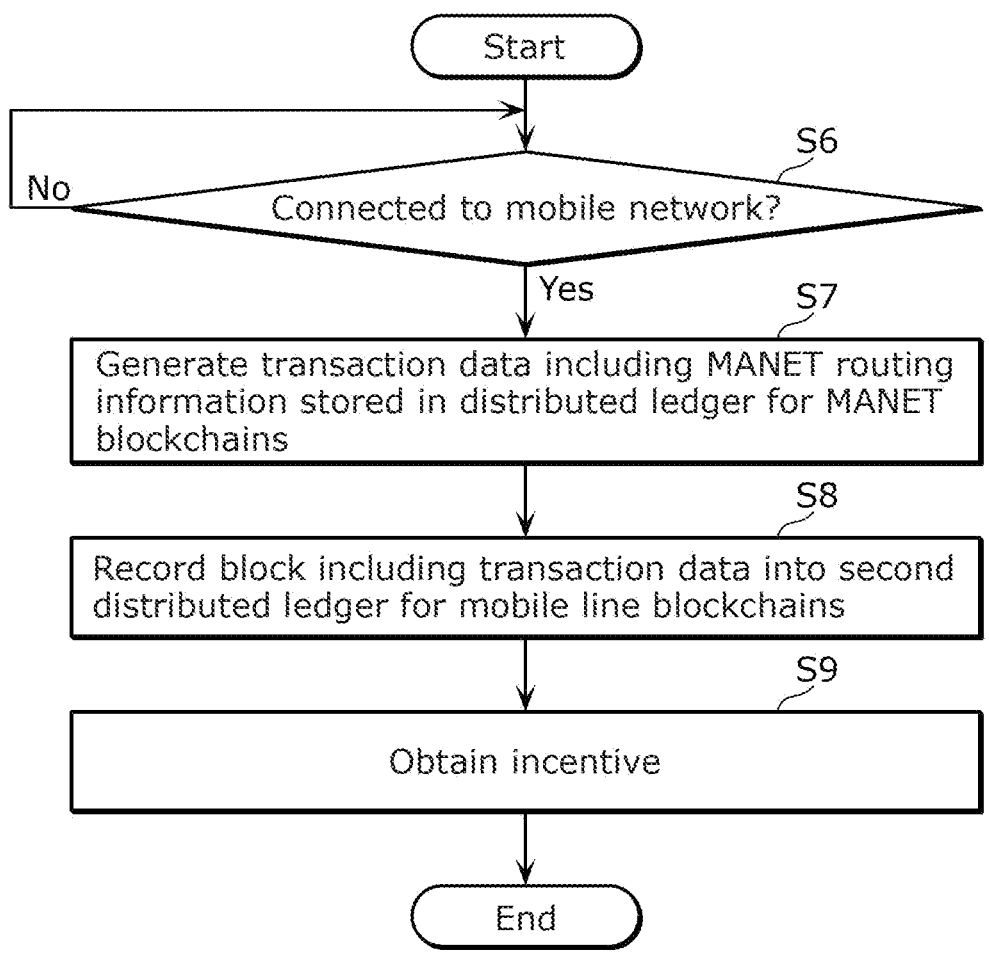
FIG. 12 is a flowchart illustrating the outline of the operation performed by a first mobile node included in a system according to the present disclosure to cause a standalone MANET to transition into a connecting MANET.

FIG. 12 is a flowchart illustrating the outline of the operation performed by the first mobile node included in the system according to the present disclosure to cause a stand-alone MANET to transition into a connecting MANET. FIG. 12 corresponds to the outline of the operation performed by the first mobile node after FIG. 11.

First, in the state where the one or more second mobile nodes are disconnected from mobile network 1, the first mobile node that has geographically moved detects whether mobile network 1 is connected (S6).

When the first mobile node is connected to mobile network 1 as a result of the geographical movement (Yes in S6), the processing proceeds to Step S7. Note that when the first mobile node is not connected to mobile network 1 even after the geographical movement of the first mobile node (No in S6), the processing does not proceed to Step S7. Therefore, the connection of the first mobile node to mobile network 1 after the geographical movement of the first mobile node triggers the transition to Step S7.

Next, the first mobile node generates transaction data including MANET routing information stored in the distributed ledger for MANET blockchains (S7). More specifically, the first mobile node generates third transaction data including at least the first MANET routing information stored in the first distributed ledger for MANET blockchain network 2A, namely, MANET distributed ledger 1071.

Next, the first mobile node records a block including the transaction data generated in Step S7 into the second distributed ledger for mobile line blockchains (S8). More specifically, the first mobile node stores the block including the third transaction data into the second distributed ledger for mobile line blockchain network 1A, namely, mobile line distributed ledger 1072.

Next, the first mobile node obtains an incentive (S9). More specifically, an incentive is provided to each of the first mobile node and the one or more second mobile nodes according to the degree of contribution to building the MANET that has been calculated on the basis of the first MANET routing information after the third transaction data is recorded into the second distributed ledger.

In this manner, when the stand-alone MANET transitions into the connecting MANET, an incentive corresponding to the degree of contribution to building the MANET is provided; therefore, it is possible to urge that the first mobile node and the second mobile nodes that are not connected to mobile network 1 geographically move and build a MANET.

[1.6 Connection Sequence with Neighbor Mobile Nodes]

Next, a sequence for geographically close mobile nodes to build a MANET will be described.

Figure 13:
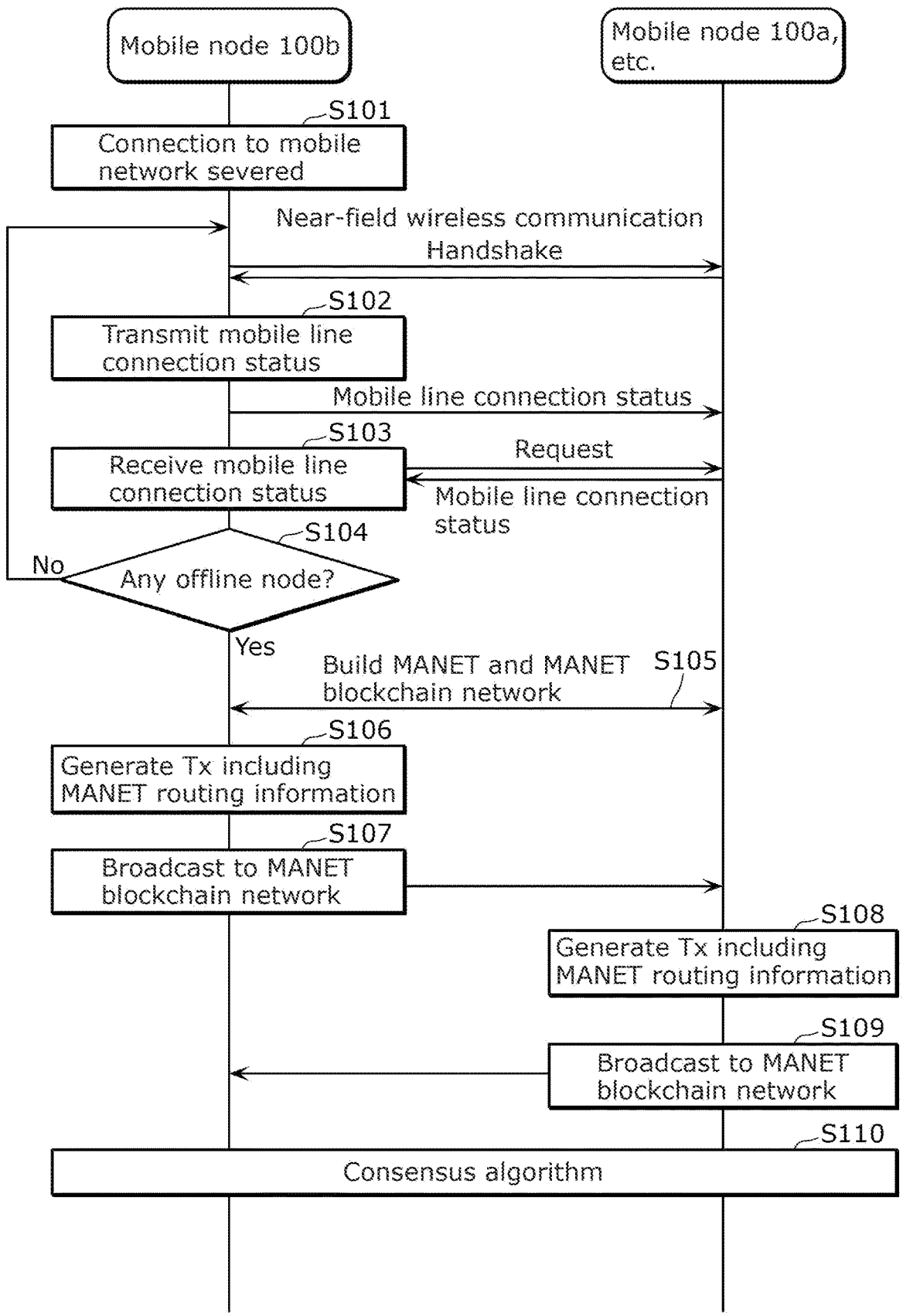
FIG. 13 is a diagram illustrating a connection sequence according to an exemplary embodiment for when a MANET is built with neighbor mobile nodes.

FIG. 13 is a diagram illustrating a connection sequence according to an exemplary embodiment for when a MANET is built with neighbor mobile nodes. In FIG. 13, in order to simplify description, the case where a stand-alone MANET is built with two mobile nodes 100*a*, 100*b* as neighbor mobile nodes will be described as an example.

First, assume that in Step S101, the connection of mobile nodes 100*a*, 100*b* to mobile network 1 is severed.

Then, mobile node 100*a* and mobile node 100*b* establish two-party near-field wireless communication by performing a handshake with each other.

Next, in Step S102, for example, mobile node 100*b* transmits, to mobile node 100*a*, the mobile line connection status of mobile node 100*b* that is the latest information indicating whether mobile node 100*b* is connected to mobile network 1.

Next, in Step S103, mobile node 100*b* requests mobile node 100*a* to transmit the mobile line connection status of mobile node 100*a* and receives the mobile line connection status of mobile node 100*a* from mobile node 100*a*.

Next, in Step S104, mobile node 100*b* determines whether there is any offline node among the mobile nodes that have established the near-field wireless communication. In the example illustrated in FIG. 13, since mobile node 100*b* has established the two-party near-field wireless communication with mobile node 100*a*, mobile node 100*b* checks whether the mobile network for each of mobile node 100*a* and mobile node 100*b* is offline. Mobile node 100*b* determines, on the basis of the mobile line connection status of the mobile node itself (mobile node 100*b*) and the mobile line connection status of mobile node 100*a* received in Step S102, whether the mobile network for each of mobile node 100*a* and mobile node 100*b* is offline. When the mobile network for at least one of mobile node 100*a* and mobile node 100*b* is offline, the processing proceeds to Step S105. In the example illustrated in FIG. 13, since the mobile network for each of mobile node 100*a* and mobile node 100*b* is offline, the processing proceeds to Step S105. Note that when the mobile networks for both of mobile node 100*a* and mobile node 100*b* are offline, the processing is suspended and returns to Step S101, and mobile node 100*b* performs a handshake with another mobile node and establishes two-party near-field wireless communication.

Next, in Step S105, by maintaining the near-field wireless communication established in Step S101, mobile node 100*a* and mobile node 100*b* build a MANET, and build a MANET blockchain network as an overlay network for said MANET.

Next, in Step S106, mobile node 100*b* generates transaction data including the latest MANET routing information of mobile node 100*b* itself.

Next, in Step S107, mobile node 100*b* broadcasts, to all the mobile nodes included in the MANET blockchain network, the transaction data including the MANET routing information that has been generated in Step S106. In the example illustrated in FIG. 13, mobile node 100*b* transmits the transaction data including the MANET routing information to mobile node 100*a*.

Next, in Step S108, as with mobile node 100*b*, mobile node 100*a* also generates transaction data including the latest MANET routing information of mobile node 100*a* itself.

Next, in Step S109, as with mobile node 100*b*, mobile node 100*a* broadcasts, to all the mobile nodes included in the MANET blockchain network, the transaction data including the MANET routing information that has been generated in Step S108. In the example illustrated in FIG. 13, mobile node 100*a* transmits the transaction data including the MANET routing information to mobile node 100*b*.

Next, in Step S110, mobile node 100*a* and mobile node 100*b* included in the MANET blockchain network execute a predetermined consensus algorithm and retrieve the transaction data into a block. In the example illustrated in FIG. 13, mobile node 100*a* and mobile node 100*b* execute the consensus algorithm and generate the same block in the MANET blockchain network. Subsequently, mobile node 100*a* and mobile node 100*b* record the generated same block into the first distributed ledgers thereof, namely, MANET distributed ledgers 1071.

[1.7 Sequence of Transition from Stand-Alone MANET into Connecting MANET]

The following will describe a transition sequence for when a stand-alone MANET transitions into a connecting MANET after the stand-alone MANET is built with mobile nodes located in an area of outage when mobile network 1 includes the area of outage.

Figure 14:
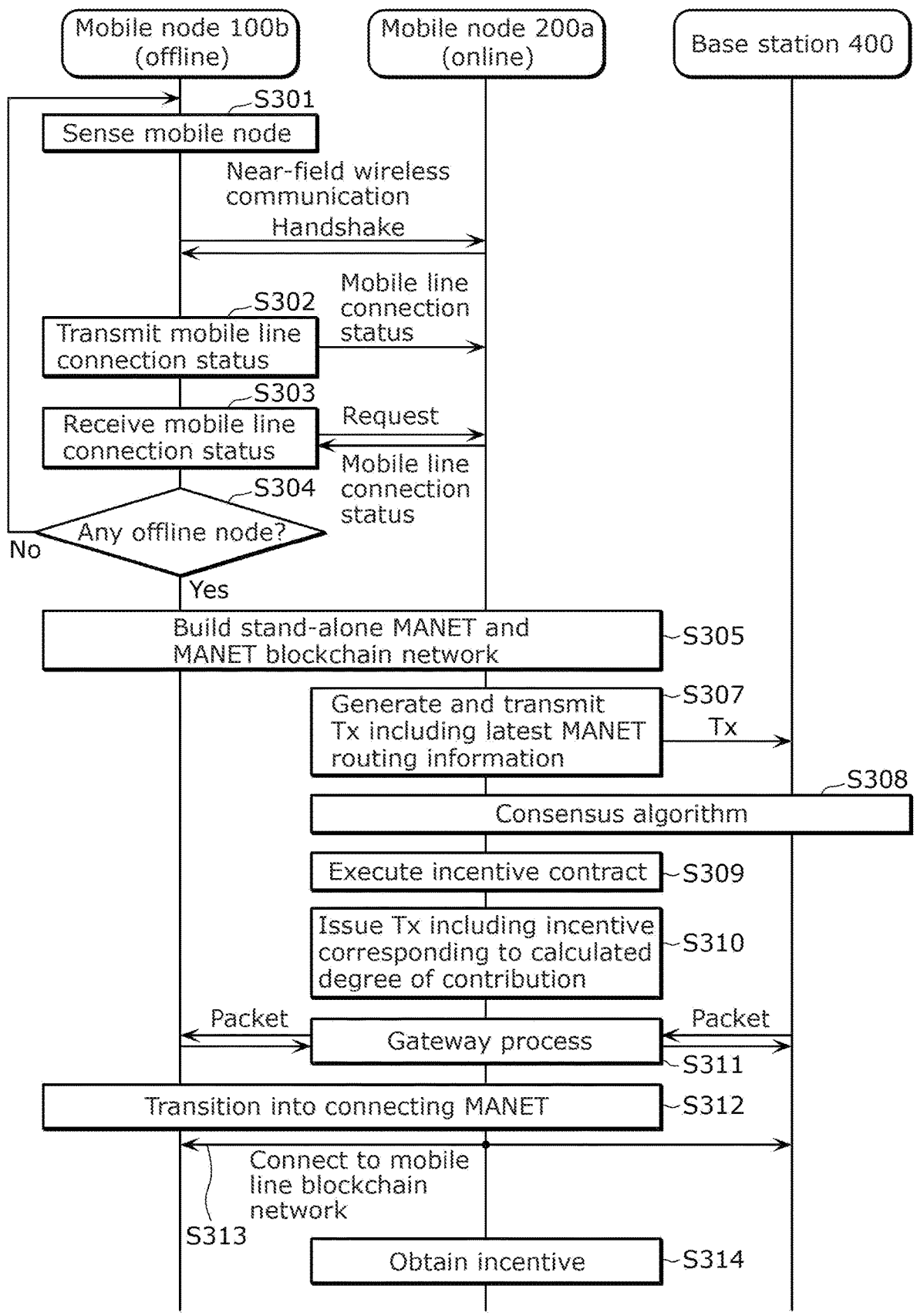
FIG. 14 is a diagram illustrating a transition sequence according to an exemplary embodiment for when a standalone MANET is built in an area of outage and then transitions into a connecting MANET.

FIG. 14 is a diagram illustrating a transition sequence according to an exemplary embodiment for when a stand-alone MANET is built in an area of outage and then transitions into a connecting MANET. In FIG. 14, in order to simplify description, the case where a MANET is built with two mobile nodes 100*b*, 200*a* located in an area of outage will be described as an example.

First, in Step S301, mobile node 100*b* located in the area of outage senses neighbor mobile node 200*a*. Then, mobile node 100*b* and mobile node 200*a* establish two-party near-field wireless communication by performing a handshake with each other.

Next, in Step S302, mobile node 100*b* transmits the mobile line connection status of mobile node 100*b* to mobile node 200*a*.

Next, in Step S303, mobile node 100*b* requests mobile node 200*a* to transmit the mobile line connection status of mobile node 200*a* and receives the mobile line connection status of mobile node 200*a* from mobile node 200*a*.

Next, in Step S304, mobile node 100*b* determines whether there is any offline node among the mobile nodes that have established the near-field wireless communication. In the example illustrated in FIG. 14, since mobile node 100*b* has established the two-party near-field wireless communication with mobile node 200*a*, mobile node 100*b* checks whether the mobile network for each of mobile node 100*b* and mobile node 200*a* is offline. Assume here that the mobile network for mobile node 100*b* is offline and the mobile network for mobile node 200*a* is online (Yes in S304); thus, the processing proceeds to Step S305. Note that when the mobile network for mobile node 100*b* is also online, the processing is suspended and returns to Step S301.

Next, in Step S305, by maintaining the near-field wireless communication established in Step S301, mobile node 100*b* and mobile node 200*a* build a stand-alone MANET, and build a MANET blockchain network. Note that each of mobile node 100b and mobile node 200a generates transaction data including the latest MANET routing information thereof and broadcasts the transaction data. Subsequently, mobile node 100b and mobile node 200a execute a predetermined consensus algorithm, generate the same block including said transaction data, and record the block into the first distributed ledger thereof, namely, MANET distributed ledger 1071.

Next, in Step S307, since the mobile network for mobile node 200a is online, mobile node 200a generates and transmits transaction data including the latest MANET routing information that has been recorded in the first distributed ledger, namely, MANET distributed ledger 1071.

Note that the transaction data is transmitted to the address of the incentive contract deployed on mobile line blockchain network 1A in advance by the servicer and is broadcast within mobile line blockchain network 1A. Furthermore, the transaction data is also broadcast to a MANET blockchain network in which mobile node 200a participates in parallel. To describe using the example illustrated in FIG. 1, the transaction data is also broadcast to mobile node 300a, mobile node 300b, and servicer node 500b that are not connected to MANET 2, but are connected to mobile network 1.

Next, in Step S308, mobile node 200a included in the mobile line blockchain network and a mobile node connected to the mobile line blockchain network via base station 400 execute a predetermined consensus algorithm. Thus, the transaction data is retrieved into a block, and the block is recorded into the second distributed ledger, namely, mobile line distributed ledger 1072.

Next, in Step S309, mobile node 200a issues, to the incentive contract, the transaction data including the latest MANET routing information that has been recorded in the second distributed ledger, namely, mobile line distributed ledger 1072, by executing the consensus algorithm. Thus, the incentive contract is carried out.

Next, in Step S310, the incentive contract calculates an incentive corresponding to the degree of contribution on the basis of the transaction data including the latest MANET routing information that has been issued in Step S309. The incentive contract issues the transaction data including the calculated incentive corresponding to the degree of contribution to the mobile line blockchain network.

On the other hand, in Step S311, mobile node 200a performs a gateway process. More specifically, mobile node 200a transmits and receives a packet (data) between mobile node 100b and the Internet by performing a gateway process between mobile node 100b and base station 400.

Note that in Step S312, the stand-alone MANET transitions into a connecting MANET, and therefore in Step S313, mobile node 100b is connected to the mobile line blockchain network through the gateway process of mobile node 200a.

Furthermore, in Step S314, mobile node 200a performs synchronization with the transaction data including the incentive that has been issued in Step S310, thereby obtaining the incentive, in other words, a token, via the address in the mobile line blockchain network.

[1.8 Advantageous Effects, etc.]

The MANET, which is a temporary network, is expected to be used as a provisional network for when backbone networks such as mobile lines are down in times of disaster or the like. In this case, it is necessary to urge mobile nodes located in an area of outage to build a stand-alone MANET, form a network topology that enables connection to the Internet, and cause the stand-alone MANET to transition into a connecting MANET. One possible approach is that the mobile nodes pay the cost of geographical movement, thereby build a stand-alone MANET, and subsequently transition into a connecting MANET.

However, since the stand-alone MANET is not connected to a backbone network, it is not possible to assess the situation from outside. Therefore, there used to be no scheme that urges the mobile nodes that have built the MANET to make further geographical movement and promote formation of an intended network topology.

In contrast, in the present disclosure, when mobile nodes including a distributed ledger for mobile networks and a distributed ledger for MANETs build a MANET, MANET routing information of the mobile nodes is recorded in the distributed ledger for MANETs. More specifically, even when there is no connection to a mobile network, by recording the MANET routing information into the first distributed ledger that is extremely difficult to tamper with, the degrees of contribution to the network topology at the time of building the MANET can be recorded in a tamper-proof format.

The MANET routing information can be used to derive the role of a mobile node in building a MANET and therefore can be defined as information of the degree of contribution to building a MANET. The MANET routing information is stored in the first distributed ledger, that is, a blockchain, and therefore is difficult to tamper with. In other words, when the MANET routing information is recorded in the first distributed ledger, attacks involving manipulation of peer information can be prevented, and therefore the MANET routing information, which is information of a peer-to-peer (P2P) ad hoc network, can be maintained in a robust manner.

Thus, users of the mobile nodes can expect to, for example, receive incentives corresponding to the degrees of contribution recorded in the first distributed ledger, meaning that it is possible to urge that the mobile nodes geographically move and build a MANET. Thus, it is possible to urge that a temporary MANET be built.

Furthermore, in the present disclosure, after the MANET is built, when one of the mobile nodes that have built the MANET is successfully connected to the mobile network, the MANET routing information recorded in the first distributed ledger can be recorded into the second distributed ledger formed in an overlay network for the mobile network. Therefore, a user of the one mobile node can expect to, for example, receive an incentive corresponding to the degree of contribution recorded in the first distributed ledger, meaning that it is possible to urge the mobile node to further make geographical movement and connect to the mobile network. Thus, it is possible to urge that a provisional network be built when cellular networks provided as backbone networks are disrupted in times of disaster, for example.

Subsequently, the degree of contribution of each mobile node to the building the MANET is determined according to the routing information recorded in the second distributed ledger, and an incentive is provided to each mobile node according to the degree of contribution thereof.

Thus, incentives corresponding to the degrees of contribution recorded in the first distributed ledger can be provided to mobile nodes that have contributed at the time of building a MANET, meaning that it is possible to urge the mobile nodes to geographically move and build a MANET.

[Other Variations]

Note that the present disclosure has been described thus far based on the above exemplary embodiment, but it goes without saying that the present disclosure is not limited to the above exemplary embodiment. The present disclosure also includes cases such as those described below.

(1) In the above exemplary embodiment, MANET communicator 101 and mobile line communicator 102 are described as being provided as separate devices, but this is not limiting. MANET communicator 101 and mobile line communicator 102 may be provided as the same device.

(2) In the above exemplary embodiment, the mobile node is described as including blockchain program executor 106 that is the same for MANET communicator 101 and mobile line communicator 102, but this is not limiting. The mobile node may include blockchain program executors 106 that are different for MANET communicator 101 and mobile line communicator 102.

(3) In the above exemplary embodiment, mobile network 1 connected to the Internet is described as a backbone network, but this is not limiting. For example, an intra-network or a local area network (LAN) may be set to a backbone network, or a configuration obtained by combining these may also be used. Specifically, mobile network 1 illustrated in FIG. 1 may be an intra-network or a LAN or have a configuration obtained by combining these.

(4) In the above exemplary embodiment, base station 400 is described as not being connected to mobile line blockchain network 1A, but this is not limiting. Base station 400 per se may also function as a blockchain node, be connected to mobile line blockchain network 1A, and include the second distributed ledger or may access the smart contract.

(5) In the above exemplary embodiment, servicer blockchain program executor 502 of servicer node 500b and blockchain program executor 106 of a mobile node are described as being different elements, but this is not limiting. Similar to servicer blockchain program executor 502 of servicer node 500b, blockchain program executor 106 of a mobile node may include a smart contract generator and deploy a smart contract.

(6) In the above exemplary embodiment, in the calculation of the ratio of the degrees of contribution to building a MANET, the ratio of the degrees of contribution is calculated on the basis of the MANET routing information recorded at the transition into a connecting MANET, but this is not limiting. For example, the degrees of contribution may be calculated considering the history of geographical movement of mobile nodes based on the history of the MANET routing information recorded while the MANET is stand-alone. In this case, for example, on the basis of the history of the MANET routing information recorded between the point in time of severing of mobile network 1 and the transition into a connecting MANET, the ratio of the degrees of contribution may be calculated from the cumulative total value of neighbor mobile nodes that are hop destinations.

(7) The above exemplary embodiment describes, as an example, the case where a crypto token is provided as an incentive, but this is not limiting. For example, the communication amount of mobile network communication in mobile network 1 may be provided as an incentive. In this case, it is sufficient that base station 400 connected to mobile line blockchain network 1A perform packet transfer control in which the communication amount provided to each mobile node is additionally taken into consideration.

(8) The above exemplary embodiment describes, as an example, the case where a crypto token is provided as an incentive, but this is not limiting. For example, a local token which is only available in backbone blockchains such as mobile line blockchain network 1A may be provided as an incentive. Note that the incentive is not limited to those generated by the incentive contract. For example, an incentive may be a discount on a communication fee that is given by a network provider to a user associated in advance with an identifier in the routing table using a ledger in the stand-alone MANET as a trail.

(9) In the above exemplary embodiment, the MANET routing information to be used as a ground for calculation of the ratio of the degrees of contribution is described as being synchronized between both mobile line blockchain network 1A and MANET blockchain network 2A, but this is not limiting. For example, the transaction data recorded in the first distributed ledger in MANET blockchain network 2A may be synchronized directly as transaction data to be recorded in the second distributed ledger in mobile line blockchain network 1A. Furthermore, while the stand-alone MANET is maintained, every transaction data generated may be recorded into the first distributed ledger, and when the stand-alone MANET transitions into a connecting MANET, transaction data including the entire latest ledger information may be generated and recorded into the second distributed ledger.

(10) In the above exemplary embodiment, the entire MANET routing information recorded in the first distributed ledger in MANET blockchain network 2A is described as being compressed, synchronized with mobile line blockchain network 1A, and recorded into the second distributed ledger, but this is not limiting. For example, a mobile node may extract a portion of the ledger information, such as the MANET routing information at the transition into a connecting MANET, and synchronize the portion with mobile line blockchain network 1A, and record the portion into the second distributed ledger.

(11) In the above exemplary embodiment, a path is selected according to the MANET routing protocol, but only the P2P connection history may be written into a distributed ledger while the MANET is stand-alone, and at the point in time when the stand-alone MANET transitions into a connecting MANET, an incentive may be determined on the basis of the synchronized history.

(12) The above exemplary embodiment is premised on active information obtainment in which at the time of recording the mobile line connection status, polling operations are performed at regular intervals and the mobile line connection status is obtained, but this is not limiting. The mobile line connection status may be passively obtained from surrounding mobile nodes by transmitting a switch for obtaining the mobile line connection status to the surrounding mobile nodes via near-field wireless communication.

(13) In the above exemplary embodiment, the selection of a mobile node subject to a handshake via near-field wireless communication is described as not depending on the past connection results, but this is not limiting. A mobile node subject to a handshake via near-field wireless communication may be selected with reference to the past connection results.

(14) Each of the devices according to the above exemplary embodiment is specifically a computer system configured of a microprocessor, read only memory (ROM), random access memory (RAM), a hard disk unit, a display unit, a keyboard, and a mouse, for example. A computer program is recorded on the RAM or the hard disk unit. Each of the devices achieves its function by way of the microprocessor operating according to the computer program. Here, the computer program is configured of a combination of command codes indicating instructions to the computer in order to achieve a predetermined function.

(15) Some or all of the structural elements included in each of the devices according to the above exemplary embodiment may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is recorded on the RAM. The system LSI achieves its function by way of the microprocessor operating according to the computer program.

Furthermore, each unit of the structural elements included in each of the devices described above may be individually configured into a single chip, or some or all of the units may be configured into a single chip.

Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(16) Some or all of the structural elements included in each of the devices described above may be implemented as a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(17) The present disclosure may be the above-described methods. Furthermore, the present disclosure may be a computer program for implementing these methods using a computer or may be a digital signal of the computer program.

Furthermore, the present disclosure may be a computer program or a digital signal recorded on a computer-readable recording medium, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recording media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may have the computer program recorded thereon, and the microprocessor may operate according to the computer program.

Moreover, by transferring the recording medium having the program or the digital signal recorded thereon or by transferring the program or the digital signal via the network or the like, the present disclosure may be implemented by a different independent computer system.

(18) The above exemplary embodiment and the above variations may be combined with each other.

INDUSTRIAL APPLICABILITY

The present disclosure can be used for a control method, a mobile node, and a recording medium with which when backbone networks are disrupted, routing information of a MANET, which is a P2P, ad hoc network, is recorded into a distributed ledger, for example, to build the MANET as a temporary network.

The invention claimed is:

1. A control method to be performed by a first mobile node in a system including a plurality of mobile nodes each including a first distributed ledger and a second distributed ledger and being connectable to a mobile line, the first mobile node being included in the plurality of mobile nodes and disconnected from the mobile line, the control method comprising:
    transmitting and receiving a mobile line connection status to and from each of one or more second mobile nodes via near-field wireless communication, the mobile line connection status being information indicating whether the mobile line is connected, the one or more second mobile nodes being one or more mobile nodes other than the first mobile node among the plurality of mobile nodes;
    building a mobile ad hoc network (MANET) with the one or more second mobile nodes based on a first mobile line connection status of the first mobile node and a second mobile line connection status of each of the one or more second mobile nodes;
    generating first transaction data after the building of the MANET, the first transaction data including at least first MANET routing information indicating a MANET connection status of the first mobile node as MANET routing information to be used to indicate a position and a role of each of the first mobile node and the one or more second mobile nodes in a network topology of the MANET; and
    recording a block including the first transaction data into the first distributed ledger that is used for a blockchain in the MANET.

2. The control method according to claim 1, wherein
in the recording of the block into the first distributed ledger,
the block that includes the first transaction data and one or more second transaction data is recorded into the first distributed ledger, each of the one or more second transaction data including second MANET routing information indicating a MANET connection status of one of the one or more second mobile nodes that has been obtained from the second mobile node.

3. The control method according to claim 1, further comprising:
    generating third transaction data when the first mobile node is connected to the mobile line in a state where the one or more second mobile nodes are disconnected from the mobile line, the third transaction data including at least the first MANET routing information recorded in the first distributed ledger; and
    recording a block including the third transaction data into the second distributed ledger that is used for a blockchain in the mobile line.

4. The control method according to claim 1, further comprising:
generating third transaction data when one second mobile node included in the one or more second mobile nodes is connected to the mobile line in a state where the one or more second mobile nodes are disconnected from the mobile line, the third transaction data including at least second MANET routing information indicating a MANET connection status of the one second mobile node that has been recorded in the first distributed ledger for the one second mobile node as the MANET routing information; and
recording a block including the third transaction data into the second distributed ledger that is used for a blockchain in the mobile line.

5. The control method according to claim 4, further comprising:
providing an incentive to each of the first mobile node and the one or more second mobile nodes according to a degree of contribution to building the MANET after the recording of the third transaction data into the second distributed ledger, the degree of contribution being calculated based on the first MANET routing information.

6. The control method according to claim 5, wherein
the first MANET routing information includes an identifier indicating each of the one or more second mobile nodes that performs the near-field wireless communication with the first mobile node in the MANET, and
in the providing of the incentive,
an incentive proportional to a total number of identifiers included in the first MANET routing information is provided to the first mobile node.

7. The control method according to claim 5, wherein
the first MANET routing information includes distance information regarding a distance between the first mobile node and each of the one or more second mobile nodes, and
a greater incentive is provided to a second mobile node among the one or more second mobile nodes that is located at a greater distance from the first mobile node.

8. The control method according to claim 5, wherein
the first MANET routing information includes information regarding radio field strength of the near-field wireless communication performed between the first mobile node and each of the one or more second mobile nodes, and
a greater incentive is provided to a second mobile node among the one or more second mobile nodes that performs the near-field wireless communication at lower radio field strength with the first mobile node.

9. The control method according to claim 1, wherein
in the recording of the block including the first transaction data into the first distributed ledger,
the block is recorded into the first distributed ledger through execution of a consensus algorithm.

10. One mobile node in a system including a plurality of mobile nodes each including a first distributed ledger and a second distributed ledger and being connectable to a mobile line, the one mobile node being included in the plurality of mobile nodes and disconnected from the mobile line, the one mobile node comprising:
a connection status transmitter/receiver that transmits and receives a mobile line connection status to and from each of one or more mobile nodes via near-field wireless communication, the mobile line connection status being information indicating whether the mobile line is connected, the one or more mobile nodes being other than the one mobile node among the plurality of mobile nodes;
a communicator that builds a MANET with the one or more mobile nodes based on a first mobile line connection status of the one mobile node and a second mobile line connection status of each of the one or more mobile nodes;
a transaction data generator that generates first transaction data after the MANET is built, the first transaction data including at least first MANET routing information indicating a MANET connection status of the one mobile node as MANET routing information to be used to indicate a position and a role of each of the one mobile node and the one or more mobile nodes in a network topology of the MANET; and
a MANET ledger unit that records a block including the first transaction data into the first distributed ledger that is used for a blockchain in the MANET.

11. A non-transitory computer-readable recording medium having recorded thereon a computer program for causing a computer to perform a control method to be performed by a first mobile node in a system including a plurality of mobile nodes each including a first distributed ledger and a second distributed ledger and being connectable to a mobile line, the first mobile node being included in the plurality of mobile nodes and disconnected from the mobile line, the computer program causing the computer to execute:
transmitting and receiving a mobile line connection status to and from each of one or more second mobile nodes via near-field wireless communication, the mobile line connection status being information indicating whether the mobile line is connected, the one or more second mobile nodes being one or more mobile nodes other than the first mobile node among the plurality of mobile nodes;
building a MANET with the one or more second mobile nodes based on a first mobile line connection status of the first mobile node and a second mobile line connection status of each of the one or more second mobile nodes;
generating first transaction data after the building of the MANET, the first transaction data including at least first MANET routing information indicating a MANET connection status of the first mobile node as MANET routing information to be used to indicate a position and a role of each of the first mobile node and the one or more second mobile nodes in a network topology of the MANET; and
recording a block including the first transaction data into the first distributed ledger that is used for a blockchain in the MANET.

* * * * *